US008523678B2

(12) United States Patent  (10) Patent No.: US 8,523,678 B2
Yamashita et al.  (45) Date of Patent: Sep. 3, 2013

(54) GAME APPARATUS AND GAME PROGRAM

(75) Inventors: Yoshikazu Yamashita, Kyoto (JP);
 Masahiro Nakamura, Kyoto (JP);
 Yuichiro Okamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 588 days.

(21) Appl. No.: 12/542,890

(22) Filed: Aug. 18, 2009

(65) Prior Publication Data
 US 2010/0323795 A1 Dec. 23, 2010

(30) Foreign Application Priority Data
 Jun. 23, 2009 (JP) .................................. 2009-148736

(51) Int. Cl.
 *G07F 17/32* (2006.01)
(52) U.S. Cl.
 USPC ............................................. 463/42; 463/43
(58) Field of Classification Search
 USPC .................................................... 463/42, 43
 See application file for complete search history.

(56) References Cited

U.S. PATENT DOCUMENTS

| 2001/0008841 A1* | 7/2001 | Komata ............................ 463/6 |
| 2005/0215319 A1* | 9/2005 | Rigopulos et al. ............... 463/32 |
| 2006/0094502 A1* | 5/2006 | Katayama et al. ............... 463/31 |
| 2008/0015031 A1* | 1/2008 | Koizumi et al. ................ 463/43 |

FOREIGN PATENT DOCUMENTS

JP  7-116353  5/1995

OTHER PUBLICATIONS

Starcraft, Blizzard Entertainment, 1998.*

* cited by examiner

*Primary Examiner* — Omkar Deodhar
(74) *Attorney, Agent, or Firm* — Nixon & Vanderhye, P.C.

(57) ABSTRACT

First, operation data is acquired from an input device that is operated by a user. Next, a target is configured, by utilizing the operation data, within a predetermined range which is frontward in a forward direction of a course where a user object should move along and which is defined based on the course. Next, a moving direction of the user object is determined based on a position of the user object and a position of the target. Next, the user object is moved toward the moving direction determined by a moving direction determining means.

17 Claims, 18 Drawing Sheets

F I G. 8
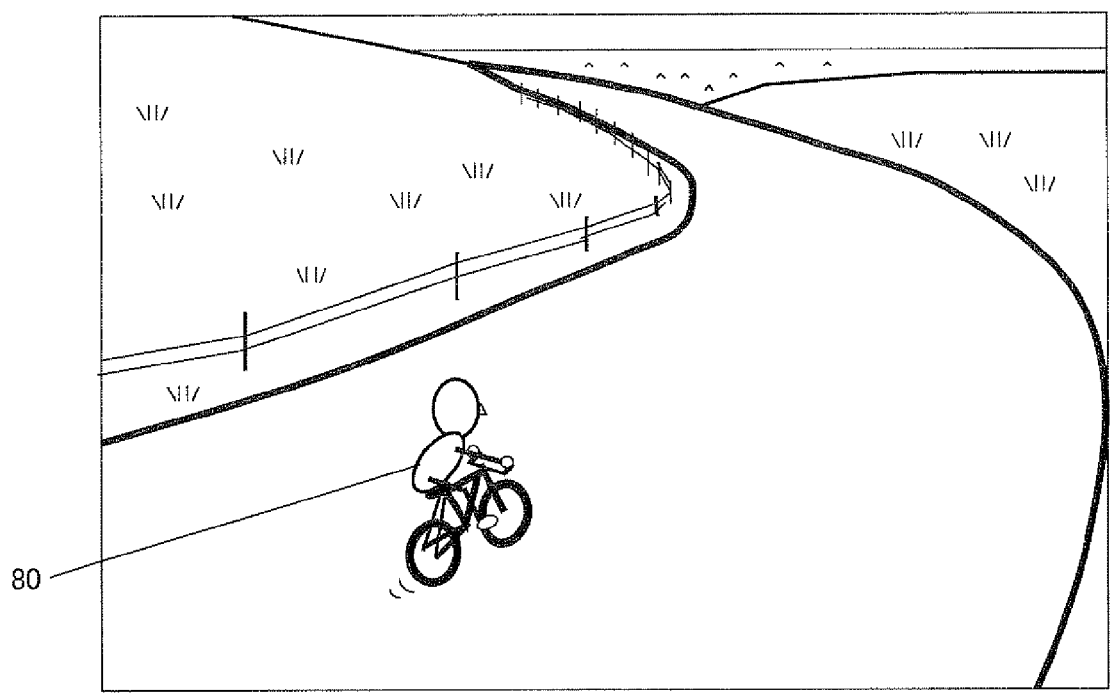

GAME APPARATUS AND GAME PROGRAM

CROSS REFERENCE TO RELATED APPLICATION

The disclosure of Japanese Patent Application No. 2009-148736, filed Jun. 23, 2009, is incorporated herein by reference.

BACKGROUND OF THE INVENTION

1. Field of the Invention

The current invention relates to a game apparatus and a game program; and more specifically relates to a game apparatus and a game program, which move a character object displayed on a displaying device in response to an operation by a user.

2. Description of the Background Art

Conventionally, there have been games in which a user is allowed to drive a user object such as an automobile and the like by conducting a steering operation. For example, Japanese Laid-Open Patent Publication No. H7-116353 discloses an automobile race game. In this game disclosed by Japanese Laid-Open Patent Publication No. H7-116353, the automobile is driven in accordance with a steering operation by the user when driving along a straight path or the like. On the other hand, the automobile is driven automatically along a predefined pathway when so called "drifting" in a curve. By this, the user can very easily conduct "drifting", which is a driving technique that requires high skills.

However, the conventional art described above has the following problem. In the conventional art described above, the user object (automobile) automatically moves along a predefined pathway in a situation that requires high-skill driving techniques (during "drifting"). As a result, since the operation by the user is not reflected in a motion of the user object, the user cannot experience a realistic operation and also cannot enjoy the operation. On the other hand, if the user object is moved based solely on the user operation under a situation that requires high-skill driving techniques, the difficulty level for operating the user object increases. Consequently, there will be cases where the user operate becomes difficult, which again leads to a circumstance where the user cannot enjoy the operation.

SUMMARY OF THE INVENTION

Therefore the objective of the current invention is to provide a highly entertaining game apparatus and a highly entertaining game program, which allow a user to enjoy an operation without losing a realistic feel for the operation in a game and the like that requires a relatively high level of operation skills.

In order to achieve at least one of the above objectives, the following configuration is adopted for the current invention. Reference numerals in parenthesis and supplementary explanations merely describe one instance of a correspondence relationship with later-described embodiments in order to help understand the current invention, hence, they do not limit the scope of the current invention in any way.

A game apparatus (12) according to a first aspect of the current invention performs a game process of moving a user object (80) within a game space, and includes: operation data acquiring means (S11); target configuring means (S124); moving direction determining means (S127); and moving means (S13, S14). The operation data acquiring means acquires operation data (201) from an input device (7) operated by a user. By utilizing the operation data, the target configuring means configures a target (300) within a predetermined range (W in FIG. 14) which is frontward in a forward direction of a course where the user object should move along (90 in FIG. 14) and which is defined based on the course. The moving direction determining means determines a moving direction (HA) of the user object based on a position of the user object and a position of the target. The moving means moves the user object toward the moving direction determined by the moving direction determining means.

According to the invention described above, the motion of the user object based on the steering operation by the user can be assisted, since the moving direction of the user object is determined based on the position of the target positioned frontward in the forward direction of the course.

Additionally, the game apparatus (12), according to the first aspect of the current invention, may further include input direction calculating means (S121) that calculates an inputted direction (UH) within the game space based on the operation data (201). In addition, the target configuring means (S124) may configure, by utilizing the inputted direction, the target by changing the position of the target configured in the immediately preceding process.

According to the invention described above, the degree of assistance provided to the motion of the user object can be changed in response to the steering operation by the user.

Furthermore, the game apparatus (12) according to the first aspect of the current invention may further include relative position configuring means (S123) that configures, based on the operation data (201), a relative position (TP) from the center of the course, within the predetermined range defined based on the course (W in FIG. 14). Additionally, the target configuring means (S124) may configure the target to a position that corresponds to the relative position within the predetermined range.

According to the invention described above, the target can be configured frontward, when viewed from the user object, in the forward direction of the course.

Furthermore, by further utilizing an alteration speed (HS) that indicates the degree of change of the inputted direction (UH), the target configuring means (S124) may change the position of the target (3DTP) configured in the immediately preceding process, and may configure the target by changing the position of the target such that the position of the target is influenced more by the inputted direction when the alteration speed is larger.

According to the invention described above, the degree of assistance provided to the motion of the user object can be changed in response to also a speed of the steering operation by the user.

Furthermore, the moving direction determining means (S127) may determine a direction, which is calculated based on the inputted direction (e in FIG. 18) and a target direction (j in FIG. 18) which is from the user object (80) toward the target (300), as the moving direction (f in FIG. 18).

According to the invention described above, the degree of assistance provided to the motion of the user object may be further adjusted.

Additionally, the input device (7) may include sensors (701, 761) that output data (202) which enables calculation of the inclination of the input device. Furthermore, the operation data (201) may include data that is outputted from the sensors.

According to the invention described above, the steering operation by the user can be detected based on the data that enables calculation of the inclination of the input device.

Furthermore, the input device (7) may include two housings (71, 77). Each of the two housings may include acceleration sensors (701, 761), which are the sensors described above; and the operation data (201) may include two acceleration data (202) outputted from each of the acceleration sensors. The input direction calculating means (S121) may calculate an average value of the inclinations of the two housings based on the two acceleration data; and calculate the inputted direction (UH) based on the average value.

According to the invention described above, the user can conduct a steering operation by, for example, holding the two housings, one in the right hand and the other in the left hand, and conducting a motion of tilting the two housings. With this, a virtual game can be provided to the user.

Furthermore, the input device (7) may include the acceleration sensors (701, 761) that output acceleration data (202) which indicates accelerations of the input device. The game apparatus (12) may further include swing-detecting means (S131, S134) that detect a swinging motion applied to the input device based on the acceleration data outputted from the acceleration sensors. The moving means (S13, S14) may increase a motion speed of the user object (80) based on a detection of an applied swinging motion.

According to the invention described above, by holding the input device in a hand and conducting a motion that swings the input device, the user can conduct an operation of moving the user object. With this, a virtual game can be provided to the user.

Furthermore, a storage medium according to a second aspect of the current invention is a computer-readable storage medium that stores a program which is to be executed by a computer (40) included in the game apparatus (12) which performs a game process of moving the user object (80) in a game space. The above described program stored in the storage medium causes the computer to function as: the operation data acquiring means (S11); the target configuring means (S124); the moving direction determining means (S127); and the moving means (S13, S14). The operation data acquiring means acquires the operation data (201) from the input device (7) operated by the user. By utilizing the operation data, the target configuring means configures the target (300) within a predetermined range (W in FIG. 14) which is frontward in the forward direction of the course where the user object should move along (90 in FIG. 14) and which is defined based on the course. The moving direction determining means determines the moving direction (HA) of the user object based on the position of the user object and the position of the target. The moving means moves the user object toward a moving direction determined by the moving direction determining means.

By this, the motion of the user object based on the steering operation by the user can be assisted, since the moving direction of the user object is determined based on the position of the target positioned frontward in the forward direction of the course.

Furthermore, the above described program stored in the storage medium according to the second aspect of the current invention may cause the computer (40) to further function as the input direction calculating means (S121) that calculates the inputted direction (UH) within the game space based on the operation data (201). In addition, the target configuring means (S124) may configure, by utilizing the inputted direction, the target by changing the position of the target configured in the immediately preceding process.

According to the invention described above, the degree of assistance provided to the motion of the user object can be changed in response to the steering operation by the user.

Furthermore, the above described program stored in the storage medium according to the second aspect of the current invention may cause the computer (40) to further function as the relative position configuring means (S123) that configures, based on the operation data (201), the relative position (TP) from the center of the course, within the predetermined range defined based on the course (W in FIG. 14). Then, the target configuring means (S124) may configure the target to a position that corresponds to the relative position within the predetermined range.

According to the invention described above, the target can be configured frontward, when viewed from the user object, in the forward direction of the course.

Furthermore, by further utilizing an alteration speed (HS) that indicates the degree of change of the inputted direction (UH), the target configuring means (S124) may change the position of the target (3DTP) configured in the immediately preceding process, and may configure the target by changing the position of the target such that the position of the target is influenced more by the inputted direction when the alteration speed is larger.

According to the invention described above, the degree of assistance provided to the motion of the user object can be changed in response to also a speed of the steering operation by the user.

Furthermore, the moving direction determining means (S127) may determine a direction, which is calculated based on the inputted direction (e in FIG. 18) and the target direction (j in FIG. 18) that is from the user object (80) toward the target (300), as the moving direction (f in FIG. 18).

According to the invention described above, the degree of assistance provided to the motion of the user object may be further adjusted.

Additionally, the input device (7) may further include sensors (701, 761) that output the data (202) which enables calculation of the inclination of the input device. Furthermore, the operation data (201) may include the data that is outputted from the sensors.

According to the invention described above, the steering operation by the user can be detected based on the data that enables calculation of the inclination of the input device.

Furthermore, the input device (7) may include the two housings (71, 77). Each of the two housings may include the acceleration sensors (701, 761), which are the sensors described above; and the operation data (201) may include the two acceleration data (202) outputted from each of the acceleration sensors. The input direction calculating means (S121) may calculate an average value of the inclinations of the two housings based on the two acceleration data; and calculate the inputted direction (UH) based on the average value.

According to the invention described above, the user can conduct a steering operation by, for example, holding each of the two housings in the right hand and the left hand respectively, and conducting a motion of tilting the two housings. With this, a virtual game can be provided to the user.

Furthermore, the input device (7) may include the acceleration sensors (701, 761) that output the acceleration data (202) which indicates accelerations of the input device. The game apparatus (12) may further include the swing-detecting means (S131, S134) that detect a swinging motion applied to the input device based on the acceleration data outputted from the acceleration sensors. The moving means (S13, S14) may increase a motion speed of the user object (80) based on a detection of an applied swinging motion.

According to the invention described above, by holding the input device in a hand and conducting a swinging motion on the input device, the user can conduct an operation of moving the user object. With this, a virtual game can be provided to the user.

According to the current invention, a highly entertaining game apparatus and a highly entertaining game program, which allow a user to enjoy an operation without losing a realistic feel for the operation in a game and the like that requires a relatively high level of operation skills, are provided.

These and other objectives, characteristics, aspects, and advantages of the current invention will be made obvious further by the following detailed description with reference to the attached drawings.

BRIEF DESCRIPTION OF THE DRAWINGS

FIG. 8 shows one example of a game image generated by a game apparatus 12 and displayed on a screen of a monitor 34;

DESCRIPTION OF THE PREFERRED EMBODIMENTS

Figure 1:
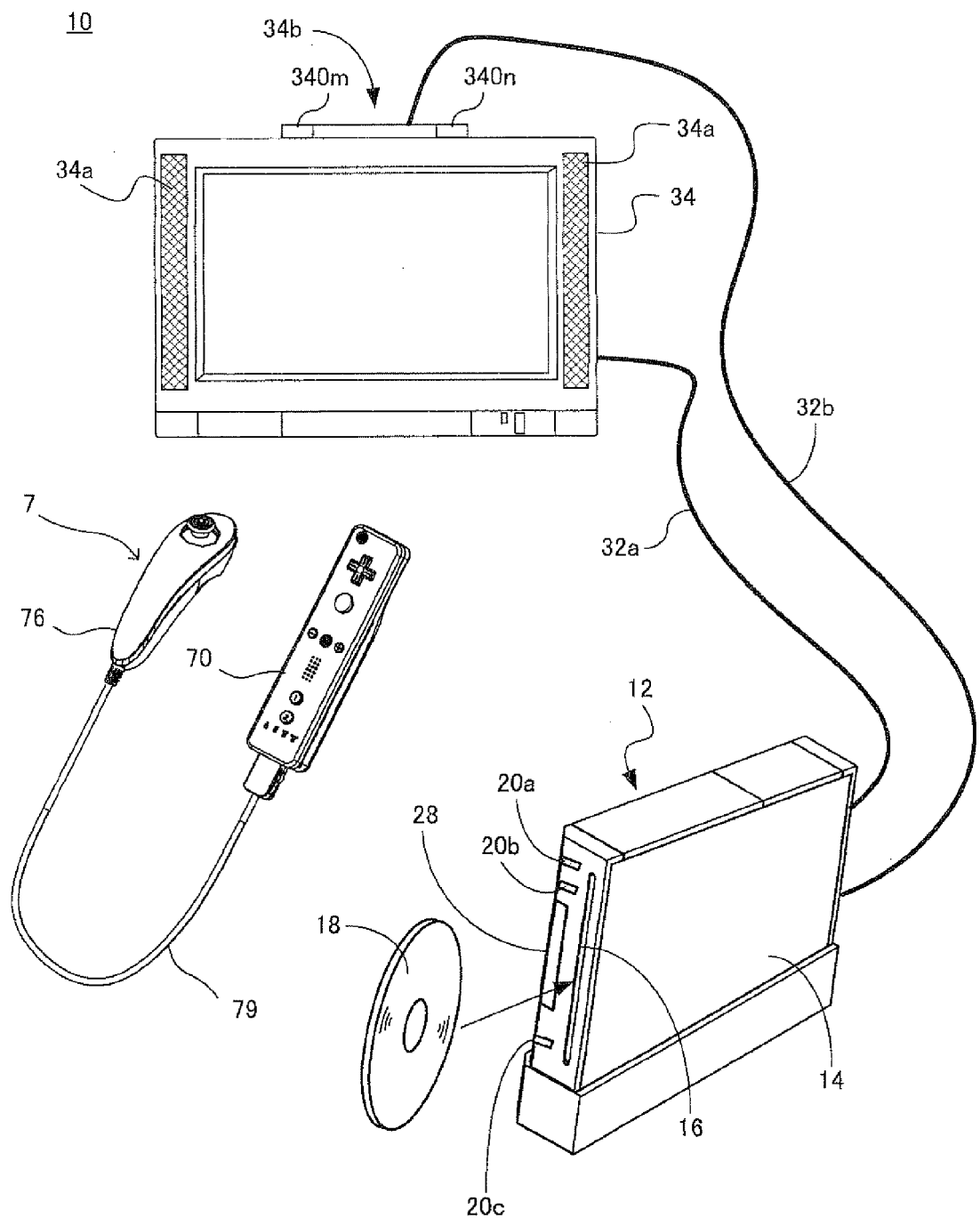
FIG. 1 is a figure showing a game system 10 which is one embodiment of the current invention.

As shown in FIG. 1, a game system 10 which is one embodiment of the current invention includes: a video game apparatus 12 (hereinafter, simply referred as "game apparatus") and a controller 7. Although a diagrammatic representation is omitted, the game apparatus 12 of the current embodiment is designed such that it can communicate with a maximum of four controllers (7). Furthermore, the game apparatus 12 and each of the controllers (7) are connected via wireless communication. For example, the wireless communication is executed in accordance with Bluetooth (registered trademark) standard, however, wireless communication may also be executed in accordance with other specifications such as infrared light and wireless LAN.

The game apparatus 12 includes a housing 14 which has an approximately parallelepiped shape, and a disk slot 16 is provided on the front surface of the housing 14. An optical disc 18, which is one example of an information storage medium that stores a game program and the like, is inserted through the disk slot 16, and the optical disc 18 is mounted on a disk drive 54 (refer FIG. 2) disposed within the housing 14. An LED and a light guide plate are disposed in the surrounding area of the disk slot 16, and the LED may be lit up in response to a variety of processes.

Furthermore, on the front surface of the housing 14 of the game apparatus 12, a power button 20a and a reset button 20b are provided on the upper section, and an eject button 20c is provided on the lower section. Moreover, an external memory card connector cover 28 is provided in between the reset button 20b and the eject button 20c in proximity of the disk slot 16. An external memory card connector 62 (refer FIG. 2) is provided inside the external memory card connector cover 28, and an external memory card (hereinafter, simply referred to as "memory card"), which is not diagrammatically represented, is inserted in the external memory card connector 62. The memory card is used for loading and temporarily storing a game program or the like which is read out from the optical disc 18, or for saving game data of a game played on this game system 10 (result data or progress data of the game). However, instead of saving the game data on the memory card, an internal memory, such as a flash memory 44 (refer FIG. 2) provided inside of the game apparatus 12, may be used to save the game data. Furthermore, the memory card may be used as a back-up memory of the internal memory.

A generic SD memory card may be used as the memory card, however, other generic memory cards such as a memory stick and a multimedia card (registered trademark) may also be used.

An AV connector 58 (refer FIG. 2) is provided on the rear surface of the housing 14 of the game apparatus 12, and the AV connector 58 is used for connecting the game apparatus 12 to a monitor 34 and a speaker 34a via an AV cable 32a. The monitor 34 and the speaker 34a are typically a part of a color television receiver, and the AV cable 32a allows a video signal that originated from the game apparatus 12 to be inputted into a video input terminal of the color television, and allows an audio signal to be inputted into an audio input terminal of the color television. Therefore, a game image of, for example, a three dimensional (3D) video game is displayed on a screen of the color television (monitor) 34, and a stereo game audio, such as a game music or a sound effect, is outputted from right and left speakers 34a. Furthermore, a marker section 34b, which includes two infrared LEDs (marker) 340m and 340n, is provided in the periphery of the monitor 34 (in the current embodiment, on the upper side) of the monitor 34). This marker section 34b is connected to the game apparatus 12 via a power cable 32b. Therefore, power is provided from the game apparatus 12 to the marker section 34b. By this, the markers 340m and 340n produce luminescence, and infrared lights are outputted from each of the markers toward the front of the monitor 34.

Power for the game apparatus 12 is provided from a general AC adaptor (not shown). The AC adaptor is plugged into a standard household wall socket, and the game apparatus 12 converts the household power (commercial power) into a low DC voltage signal suitable for driving the game apparatus 12. A battery may be used as a power source in another embodiment.

With regard to this game system 10, the user first turns on the power of the game apparatus 12 in order for the user to play a game (or other applications instead of a game); and then the user selects, as appropriate, an optical disc 18 in which a video game program is recorded (or another application desired to be played), resulting in the loading of the optical disc 18 onto the disk drive 54 of the game apparatus 12. Consequently, the game apparatus 12 starts executing the video game or another application based on a program recorded on the optical disc 18. The user operates a controller 7 in order to provide input to the game apparatus 12. The controller 7 includes a core unit 70, a subunit 76, and a connection cable 79, and the core unit 70 and the subunit 76 are connected to each other with the connection cable 79. For example, the user can start a game or another application by operating a specific operation button provided on the core unit 70. Furthermore, other than by operating the operation button, the user can cause an animated object (user object) to move in a different direction, or change the user's viewpoint (camera position) within the 3D game world, by moving the core unit 70 or the subunit 76 themselves.

Figure 2:
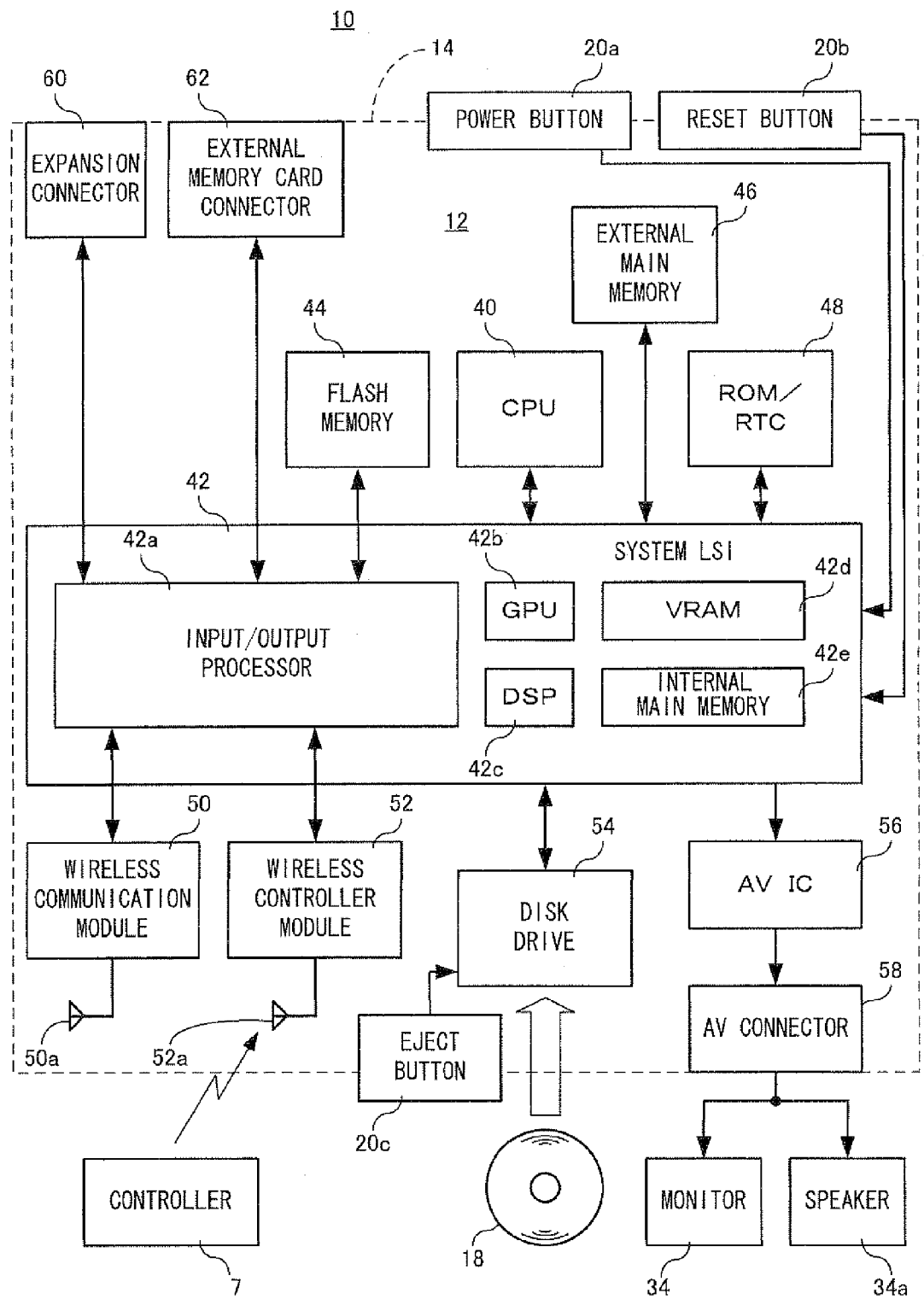
FIG. 2 is a block diagram showing an electrical configuration of the video game system 10 which is one embodiment of the current invention.

FIG. 2 is a block diagram showing an electrical configuration of the video game system 10 of the current embodiment. Although not shown, each component within the housing 14 is mounted on a printed-circuit board. As shown in FIG. 2, a CPU 40 is provided to the game apparatus 12. This CPU 40 functions as a game processor. A system LSI 42 is connected to the CPU 40. An external main memory 46, a ROM/RTC 48, the disk drive 54, and an AV IC 56 are connected to the system LSI 42.

The external main memory 46 is used: for storing programs such as a game program and the like; for storing various data; and as a work area and a buffer area of the CPU 40. The ROM/RTC 48, which is a so-called boot ROM, is incorporated with a program in order to start up the game apparatus 12. The ROM/RTC 48 is also provided with a clock circuit for counting time. The disk drive 54 reads out program data, texture data, or the like from the optical disc 18; and writes these data onto a later described internal main memory 42e or an external main memory 46, under a control of the CPU 40.

An input/output processor 42a, a GPU (Graphics Processor Unit) 42b, a DSP (Digital Signal Processor) 42c, a VRAM 42d, and the internal main memory 42e, are provided to the system LSI 42. Although not shown, these components are connected to each other by an internal bus.

The input/output processor (I/O processor) 42a executes transmission and reception of data, and also executes download of data. Transmission and reception, and download of data are described in detail below.

The GPU 42b forms a part of drawing means, and upon receiving a graphics command (drawing generation order) from the CPU 40, follows the command and generates game image data. In addition to the graphics command, the CPU 40 also provides the GPU 42b with an image-generating program necessary for generating the game image data.

Although not shown, the VRAM 42d is connected to the GPU 42b as described above. The GPU 42b accesses the VRAM 42d in order to acquire data (image data which is data such as polygon data and texture data) necessary for the GPU 42b to execute the drawing generation order. The CPU 40 writes the image data necessary for drawing onto the VRAM 42d via the GPU 42b. The GPU 42b forms game image data by accessing the VRAM 42d.

In the current embodiment, a case is described in which the GPU 42b generates the game image data. However, in a case in which an arbitrary application other than a game application is executed, the GPU 42b generates image data for the arbitrary application.

Furthermore, the DSP 42c functions as an audio processor, and generates audio data that corresponds to a sound, an audio, and a music, which are then to be outputted from the speaker 34a. The generation of the audio data by the DSP 42c is conducted by using sound data and sound waveform (tone) data, which are stored in the internal main memory 42e and the external main memory 46.

As described above, the generated game image data and audio data are read by the AV IC 56, and are outputted from the monitor 34 and the speaker 34a via the AV connector 58. Therefore, a game screen is displayed on the monitor 34, and a sound (music) necessary for the game is outputted from the speaker 34a.

Furthermore, connected to the input/output processor 42a are: the flash memory 44, a wireless communication module 50, and a wireless controller module 52. Additionally, an expansion connector 60 and the external memory card connector 62 are also connected to the input/output processor 42a. Moreover, an antenna 50a is connected to the wireless communication module 50, and the antenna 52a is connected to the wireless controller module 52.

The input/output processor 42a can communicate, via the wireless communication module 50, with other game apparatuses and various servers connected to a network. However, the input/output processor 42a can also communicate directly with other game apparatuses without going through the network. The input/output processor 42a periodically accesses the flash memory 44, and detects whether data (transmission data) that needs to be transmitted to the network exists or not, and if there is such transmission data, this transmission data is transmitted to the network via the wireless communication module 50 and the antenna 50a. Furthermore, the input/output processor 42a receives data (received data) transmitted from other game apparatuses via, the network, the antenna 50a, and the wireless communication module 50; and stores the received data onto the flash memory 44. However, there are cases in which the received data is discarded without being stored. Furthermore, the input/output processor 42a receives data (download data) downloaded from a download server via the network, the antenna 50a, and the wireless communication module 50; and stores the download data onto the flash memory 44.

Moreover, the input/output processor 42a receives input data transmitted from the controller 7 via the antenna 52a and the wireless controller module 52; and (temporary) stores the input data onto a buffer area of the internal main memory 42e or the external main memory 46. The input data is erased from the buffer area after being used by a game process of the CPU 40.

As described above, in the current embodiment, the wireless controller module 52 communicates with the controller 7 in accordance with Bluetooth (registered trademark) standard.

Moreover, the expansion connector 60 and the external memory card connector 62 are connected to the input/output processor 42a. The expansion connector 60 is a connector for an interface, such as USB or SCSI, and can connect to a medium such as an external storage medium, and can also connect to peripheral devices such as other controllers. Furthermore, a LAN cable adaptor may be connected to the expansion connector 60, and this LAN cable adaptor may be used instead of the wireless communication module 50. An external storage medium such as a memory card may be connected to the external memory card connector 62. Therefore, for example, the input/output processor 42a can access the external storage medium via the expansion connector 60 and the external memory card connector 62; and can save data to, or read data from the external storage medium.

Although not described in detail, the power button 20a, the reset button 20b, and the eject button 20c, are disposed on the game apparatus 12 (housing 14) as shown in FIG. 1. The power button 20a is connected to the system LSI 42. When this power button 20a is turned on, power is provided through the AC adaptor which is not diagrammatically represented, to each component of the game apparatus 12, and the system LSI 42 is set to a normal electricity conducting state mode (normal mode). On the other hand, when the power button 20a is turned off, power is provided only to a part of the components of the game apparatus 12, and the system LSI 42 is set to a mode that suppresses electricity consumption to a minimum necessary level (hereinafter, referred to as "stand-by mode"). In this embodiment, when set to the stand-by mode, the system LSI 42 instructs termination of power supply for components other than the input/output processor 42a, the flash memory 44, the external main memory 46, the ROM/RTC 48, the wireless communication module 50, and the wireless controller module 52. Therefore, this stand-by mode is a mode in which execution of an application by the CPU 40 is not conducted.

Although power is provided to the system LSI 42 even in the stand-by mode; electricity consumption is reduced by not providing a clock signal to the GPU 42b, the DSP 42c, and the VRAM 42d, and by preventing these components from driving.

Although not shown, a fan is provided inside the housing 14 of the game apparatus 12, in order to discharge heat generated from ICs such as the CPU 40 and the system LSI 42. The fan is also stopped in the stand-by mode.

However, when the user does not intend to use the stand-by mode, by applying a setting that does not use the stand-by mode, supply of power to all circuit components is completely terminated when the power button 20a is turned off.

Furthermore, switching between the normal mode and the stand-by mode can also be conducted through remote operation by switching on/off a power switch 72h (refer FIG. 3) provided to the controller 7. When the remote operation is not conducted, a setting that does not supply power to the wireless controller module 52 in the stand-by mode may be applied.

The reset button 20b is also connected to the system LSI 42. When the reset button 20b is pressed, the system LSI 42 restarts a start-up program of the game apparatus 12. The eject button 20c is connected to the disk drive 54. When the eject button 20c is pressed, the optical disc 18 is discharged from the disk drive 54.

<Controller 7>

Figure 3:
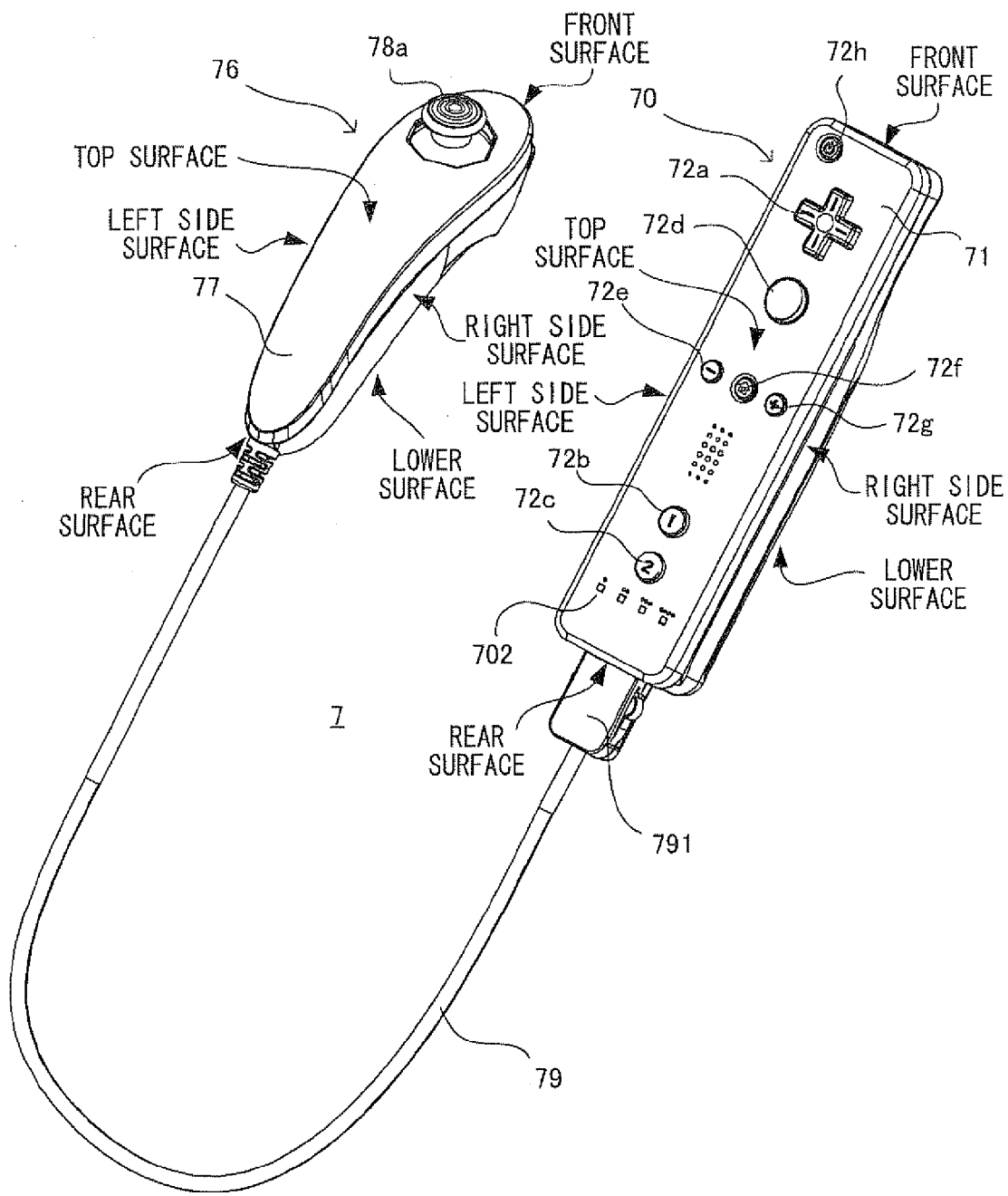
FIG. 3 is a diagrammatic perspective view of an external configuration of a controller 7.

The controller 7 will be described below with reference to FIG. 3 to FIG. 6. FIG. 3 is a diagrammatic perspective view showing the external configuration of the controller 7.

As shown in FIG. 3, the controller 7 includes the core unit 70, the subunit 76, and the connection cable 79; and the core unit 70 and the subunit 76 are connect to each other with the connection cable 79. The core unit 70 includes a housing 71, and the housing 71 is provided with a plurality of operation sections 72. On the other hand, the subunit 76 includes a housing 77, and the housing 77 is provided with a plurality of operation sections 78.

A connector 791 provided at one end of the connection cable 79, and the other end of the connection cable 79 is statically connected to the subunit 76. The connector 791 of the connection cable 79 is engaged with the connector 73 (refer FIG. 4) provided on the rear surface of the core unit 70, hence, the core unit 70 and the subunit 76 are connected via the connection cable 79.

The core unit 70 includes a housing 71 formed, for example, by plastic molding. The housing 71 has an approximately parallelepiped shape, and has an overall size small enough for being held by one hand of an adult or a child.

A cross key 72a, which is direction-instructing means, is provided on the top surface of the housing 71. This cross key 72a is a cross-shaped four-directional push switch. Operation sections are disposed on each of the four projecting portions of the cross-shape at 90° intervals, and each of the four operation sections corresponds to four directions (up, down, right, and left). By having the user hold down one operation section of the cross key 72a, either one direction of, up, down, right, or left, is selected. For example, by operating the cross key 72a, the user can give an instruction about a moving direction of a user character or the like that appears in a virtual game world, or give an instruction about a moving direction of a cursor. A joystick, which is capable of giving instructions in a 360° range direction, may be provided instead of the cross key 72a.

A plurality of operation buttons 72b to 72g are provided on the side toward the rear surface from the cross key 72a, on the top surface of the housing 71. The operation buttons 72b to 72g are operation sections that output operation signals assigned to each of the operation buttons 72b to 72g, by having the user hold down a button head section. For example, functions such as a No. 1 button, a No. 2 button, and an A button, are assigned to operation buttons 72b to 72d, respectively. Furthermore, functions such as a minus button, a home button, and a plus button, are assigned to operation buttons 72e to 72g, respectively. Various functions are assigned to these operation buttons 72b to 72g depending on a game program executed by the game apparatus 12.

Furthermore, the power switch 72h is provided on the side toward the front surface from the cross key 72a, on the top surface of the housing 71. The power switch 72h is an operation section for turning on/off the power of the game apparatus 12 by remote control.

Moreover, a plurality of LEDs 702 are provided on the side toward the rear surface from the operation button 72c, on the top surface of the housing 71. Here, a controller 7 is provided with a controller type (number) in order to be distinguished from other controllers 7. In one instance, the LEDs 702 are used to notify the user about the above described controller type currently assigned to a controller 7. Specifically, among the plurality of LEDs 702, an LED that corresponds to the controller type lights up, when transmission data is transmitted from the core unit 70 to the game apparatus 12.

Furthermore, sound holes are formed on the top surface of the housing 71 in between the operation button 72b and the operation button 72f, in order to release outwards a sound that originated from a later described speaker 706 (refer FIG. 4).

Additionally, an operation button (not shown) is provided on the lower surface of the housing 71 in a position where an index finger or a middle finger of the user is positioned when the core unit 70 is held by the user. This operation button is an operation section that functions as, for example, a B button; and used, for example, as a trigger switch in a shooting game.

Furthermore, an image pickup device 743 (refer FIG. 6) that consists a part of an imaging information calculation section 74 (refer FIG. 6) is provided on the front surface of the housing 71. The imaging information calculation section 74 is a system that analyzes image data that have been taken by the core unit 70, determines a location that has the highest brightness from this analysis, and detects the center of gravity, size, and the like of this location. For example, since the imaging information calculation section 74 analyzes image data sampled at a sampling cycle of about a maximum of 200 frame/second, the imaging information calculation section 74 is capable of tracking and analyzing a relatively high-speed motion of the core unit 70. The detailed configuration of this imaging information calculation section 74 is described later. Furthermore, the connector 73 (refer FIG. 4) is provided on the rear surface of the housing 71. The connector 73 is, for example, a 32-pin edge connector, and is used for engaging and connecting to the connector 791 of the connection cable 79.

An internal structure of the core unit 70 will be described below with reference to FIG. 4. FIG. 4 is a diagrammatic perspective view of a state in which an upper case of the core unit 70 (a part of housing 71) is removed.

Figure 4:
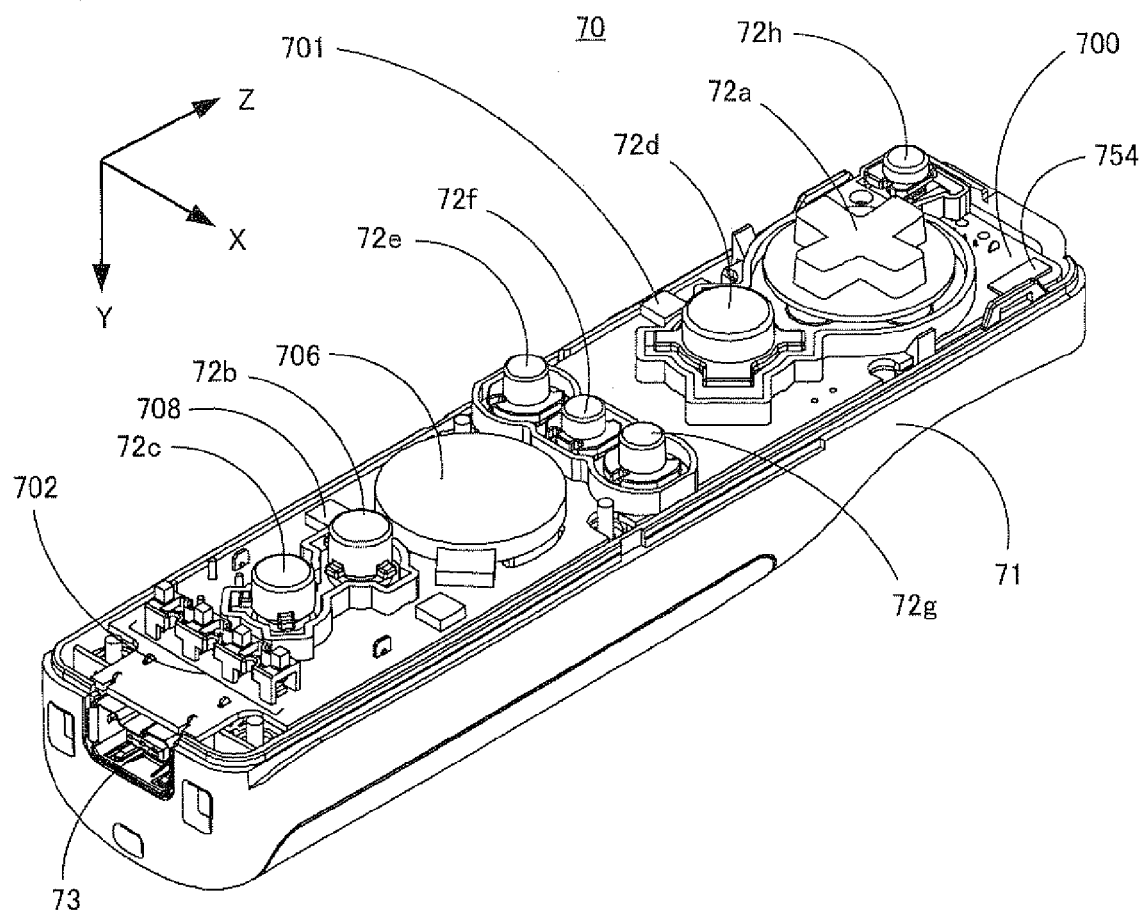
FIG. 4 shows an internal structure of a core unit 70.

As shown in FIG. 4, a substrate 700 is fixed inside the housing 71; and the operation buttons 72a to 72h, an acceleration sensor 701, the LEDs 702, the speaker 706, an antenna 754, and the like are provided on an upper main surface of the substrate 700. These components are connected to a microcomputer 751 (refer FIG. 6) and the like by wirings (not shown) formed on the substrate 700 and the like. By providing the acceleration sensor 701 at a peripheral section of the substrate 700 rather than at a central section, a rotation of the core unit 70 can be decided with an excellent sensitivity from detected acceleration data by a predetermined calculation, since an acceleration included in a centrifugal force component is detected together with a directional change of a gravitational acceleration in response to a rotation about a longitudinal direction axis of the core unit 70.

On the other hand, the imaging information calculation section 74 and the connector 73 are attached to a lower main surface of the substrate 700.

Figure 5:
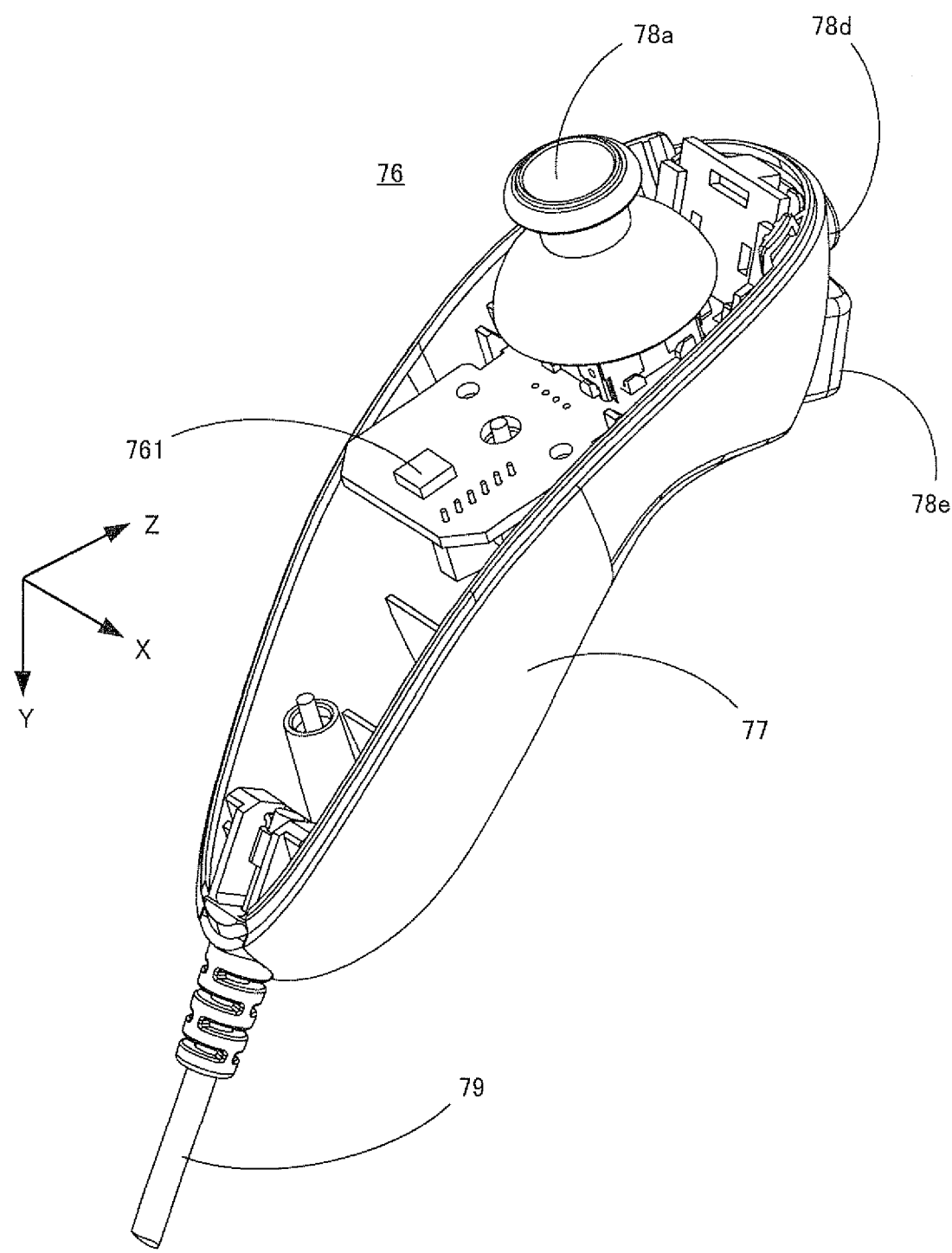
FIG. 5 shows an internal structure of a subunit 76.

The subunit 76 will be described below with reference to FIG. 3 and FIG. 5. FIG. 5 is a diagrammatic perspective view showing a state in which an upper case of the subunit 76 (a part of the housing 77) is removed.

As shown in FIG. 3, the subunit 76 has the housing 77 formed, for example, by plastic molding. The housing 77 has an overall size small enough for being held by one hand of an adult or a child.

A stick 78a, which is direction-instructing means, is provided on the top surface of the housing 77. The stick 78a is an operation section, and by tilting down the stick which projects out from the top surface of the housing 77 and is capable of being tilted down, the stick outputs an operation signal in response to the direction where the stick is tilted down. For example, by tilting down the stick tip to an arbitrary direction chosen from a 360° range, the user can point to an arbitrary direction or position; and can give an instruction about a moving direction of a user character or the like that appears in a virtual game world, or give instructions about a moving direction of a cursor. A cross key may be provided instead of the stick 78a.

Operation buttons 78d and 78e are provided on the front surface of the housing 77 of the subunit 76 (refer FIG. 5). The operation buttons 78d and 78e are operation sections that output operation signals assigned respectively to each of the operation buttons 78d and 78e, as a result of the user holding down a button head section. For example, functions such as an X button and a Y button are assigned to operation buttons 78d and 78e respectively. Depending on a game program executed by the game apparatus 12, various functions are assigned to these operation buttons 78d and 78e.

As shown in FIG. 5, a substrate is fixed inside the housing 77, and the stick 78a, the acceleration sensor 761, and the like are provided on an upper main surface of the substrate. These components are connected to the connection cable 79 via wirings (not shown) formed on the substrate and the like.

Figure 6:
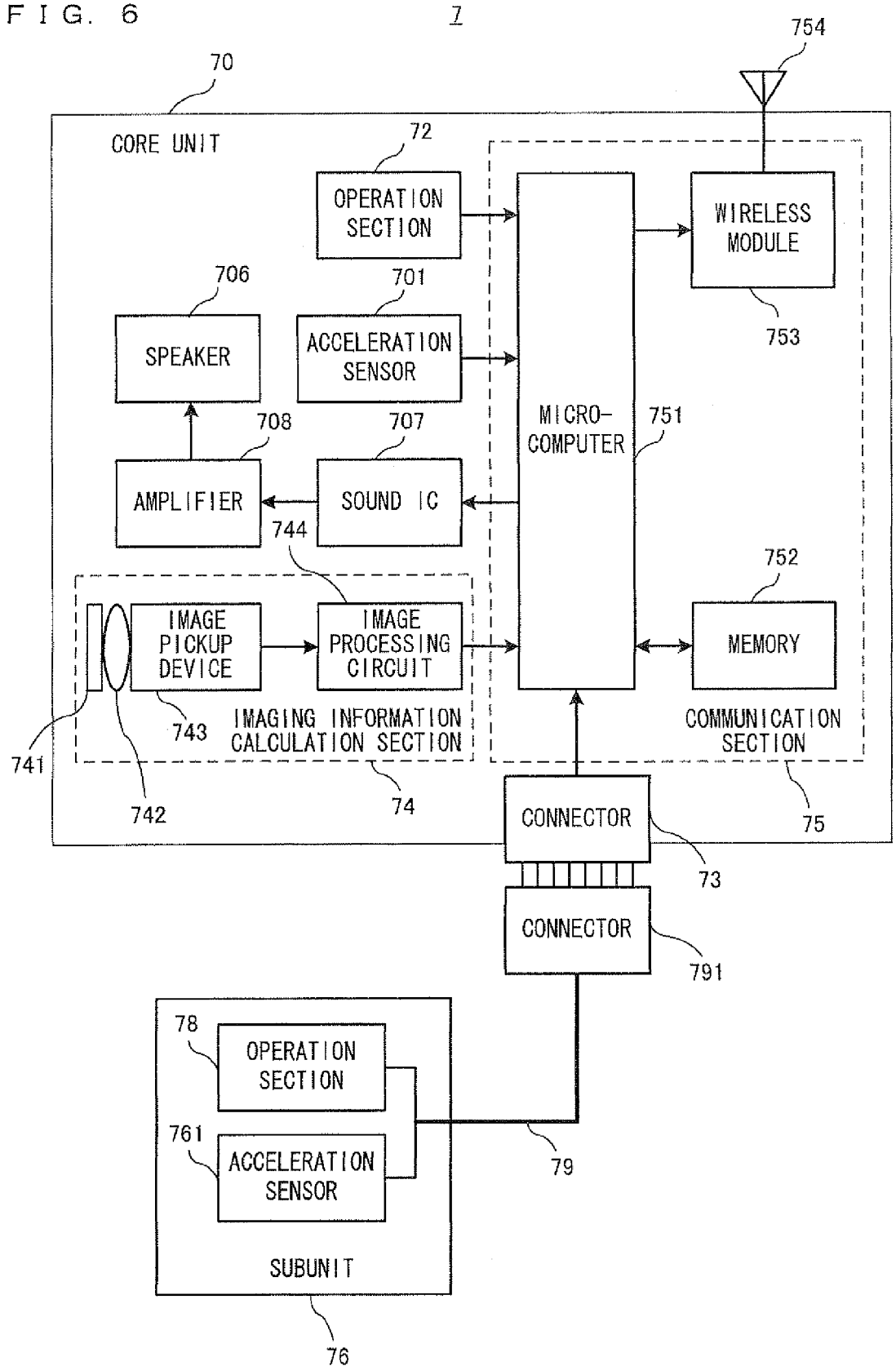
FIG. 6 shows an internal configuration of a controller 7.

An internal configuration of the controller 7 will be described below with reference to FIG. 6. FIG. 6 is a block diagram showing the configuration of the controller 7.

As shown in FIG. 6, the core unit 70 includes: the operation sections 72, the imaging information calculation section 74, the acceleration sensor 701, the speaker 706, a sound IC 707, an amplifier 708, and a communication section 75 that is disposed inside of the core unit 70. Furthermore, the subunit 76 includes the operation sections 78 and the acceleration sensor 761, both of which are described above; and the subunit 76 is connect to the microcomputer 751 via the connection cable 79, the connector 791, and the connector 73.

The imaging information calculation section 74 includes: an infrared filter 741, a lens 742, an image pickup device 743, and an image processing circuit 744. Among the incoming light from the front surface of the core unit 70, only infrared light is allowed to pass through the infrared filter 741. The lens 742 converges the infrared light that is transmitted through the infrared filter 741, and outputs the converged infrared light toward the image pickup device 743. The image pickup device 743 is a solid image pickup element, for example, such as a CMOS sensor or a CCD, and takes an image of the infrared light that is converged by the lens 742. Therefore, the image pickup device 743 generates image data by imaging only the infrared light that passed through the infrared filter 741. The image data generated by the image pickup device 743 is processed by the image processing circuit 744. Specifically, the image processing circuit 744: processes the image data obtained from the image pickup device 743; senses areas of the image which have high brightness; and outputs, process result data indicating a detection result of positional coordination and area size of such areas, to the communication section 75. The imaging information calculation section 74 is fixed on the housing 71 of the core unit 70, and the imaging direction of the imaging information calculation section 74 can be altered by changing the direction of the housing 71 itself. A signal in response to the position and the motion of the core unit 70 can be obtained based on the process result data outputted from this imaging information calculation section 74.

In the current embodiment, the core unit 70 includes the acceleration sensor 701. Here, the core unit 70 preferably includes an acceleration sensor 701 adapted for three axes orthogonal to each other (X-axis, Y-axis, and Z-axis of FIG. 4). Furthermore, the subunit 76 preferably includes an acceleration sensor 761 adapted for three axes (X-axis, Y-axis, and Z-axis of FIG. 5). The three-axis acceleration sensors 701 and 761 sense linear accelerations in three directions, which are the X-axis direction, the Y-axis direction, and the Z-axis direction. Furthermore, in another embodiment, two-axis acceleration detection means that senses linear accelerations only along each of the X-axis direction and the Y-axis direction (or a direction of other pairs) may be used depending on the type of control signal used in a game process. Moreover, one-axis acceleration detection means that senses a linear acceleration only along an X-axis direction (or along another direction) may be used. For example, the acceleration sensors 701 and 761 of three-axis, two-axis, or one-axis type, may be a type available from Analog Devices, Inc., or STMicroelectronics N.V. The acceleration sensors 701 and 761 may be an electrostatic capacitance type (capacitance-coupling type) based on silicon micro-machined MEMS (Micro Electro Mechanical Systems) technology. Furthermore, the acceleration sensors 701 and 761 of three-axis, two-axis, or one-axis, may be provided from a suitable technology of known acceleration detection means (e.g. piezoelectric method or piezoresistance type method) or from another suitable technology that might be developed in the future.

As understood by anyone skilled in the art, such acceleration detection means that is used in acceleration sensors 701 and 761 can only sense acceleration (linear acceleration) along a straight line which corresponds to each axis of the acceleration sensor. Thus, direct outputs from the acceleration sensors 701 and 761 are signals indicating linear acceleration (static or dynamic) along each axis. Therefore, the acceleration sensors 701 and 761 cannot directly sense physical properties such as a motion along a non-linear (e.g. circular arc shape) pathway, a rotation, a rotational motion, an angular displacement, the inclination, the position, the attitude, and the like.

However, by reading the description in this specification, anyone skilled in the art can easily understand that additional information regarding the core unit 70 and the subunit 76 can be presumed or calculated from additionally processing acceleration signals outputted from each of the acceleration sensors 701 and 761. For example, when a static acceleration (gravitational acceleration) is sensed, inclinations against the gravity vector for each of the objects (core unit 70 and subunit 76) can be presumed from a calculation using, an inclination angle and the sensed acceleration, which are both obtained by outputs from the acceleration sensors 701 and 761. As described above, inclinations, attitudes and positions of the core unit 70 and the subunit 76 can be determined by using a combination of the acceleration sensors 701 and 761 and the microcomputer 751 (or another processor). Similarly, when the core unit 70 having the acceleration sensor 701, and the subunit 76 having the acceleration sensor 761, for example, are accelerated dynamically by the user's hands, the core unit 70 and the subunit 76 can calculate or presume their various motions and/or positions, by processing each of the acceleration signals generated by the acceleration sensors 701 and 761. In an alternate embodiment, the acceleration sensors 701 and 761 each may include an embedded signal processing apparatus or another type of process apparatus for, before outputting a signal to the microcomputer 751, conducting a desired process on the acceleration signal outputted from the built-in acceleration detection means. For example, when the acceleration sensor is designed for detecting a static acceleration (e.g. gravitational acceleration), the embedded or dedicated process apparatus may be designed for converting sensed acceleration signals into each of the corresponding inclination angle. Data that represent accelerations sensed by the acceleration sensors 701 and 761 are outputted to the communication section 75.

In the description above, motions of core unit 70 and subunit 76 are each detected by using acceleration represented by acceleration data in directions of the three axes obtained from the acceleration sensor 701 and 761 respectively. However, each of the motions of the core unit 70 and the subunit 76 may be detected by using data outputted from another type of sensor fixed in the core unit 70 and the subunit 76 respectively. For example, data outputted from: a sensor (acceleration sensor, inclination sensor) that outputs data in response to the inclination of the core unit 70 against the gravity direction (hereinafter, simply referred to as "inclination"); a sensor (magnetic sensor) that outputs data in response to a direction of the core unit 70; a sensor (gyro sensor) that outputs data in response to a rotational motion of the core unit 70; and the like, may be used. Similarly, data outputted from: a sensor (acceleration sensor, inclination sensor) that outputs data in response to the inclination of the subunit 76 against the gravity direction (hereinafter, simply referred to as "inclination"); a sensor (magnetic sensor) that outputs data in response to a direction of the subunit 76; a sensor (gyro sensor) that outputs data in response to a rotational motion of the subunit 76; and the like, may be used. Furthermore, not only those capable of detecting motions in multiple axes, but also those capable of detecting motions in one axis can be used as the acceleration sensor and the gyro sensor. Additionally, a more precise detection of motions may be conducted by combining any of the above-described sensors. A camera fixed on the core unit 70 (e.g. the imaging information calculation section 74) can also be used as any of the sensors described above. In this case, since an image taken by the camera will change in response to a motion of the core unit 70, the motion of the core unit 70 can be decided by analyzing this image. Furthermore, by disposing a camera to the subunit 76 that is similar to the camera fixed on the core unit 70 (e.g. the imaging information calculation section 74), a motion of the subunit 76 can be decided by a similar method.

The above-described sensor may be provided separately on the exterior of the controller 7 depending on the type of the sensor. The motions of the core unit 70 and the subunit 76 can be decided by, as one example, taking an image covering the whole body of the controller 7 (the core unit 70 and the subunit 76) from the exterior of the controller 7 by a camera as a sensor, and analyzing an image of the controller 7 in the taken image. Moreover, a system which allows a cooperative functioning of two units, one unit fixed in the controller 7 and the other unit separately provided on the exterior of the controller 7, may also be used. In one example of this system, a light-emitting unit (the marker section 34b in FIG. 1) is separately provided on the exterior of the controller 7, and cameras fixed to both the core unit 70 and the subunit 76 (e.g. the imaging information calculation section 74) photograph a light from the light emitting unit. The motions of the core unit 70 and the subunit 76 can be decided by analyzing the images taken by these cameras. Furthermore, listed as another example is a system in which a magnetic field generator is separately provided on the exterior of the controller 7 and magnetic sensors are fixed to the core unit 70 and the subunit 76 respectively.

The communication section 75 includes: the microcomputer 751, a memory 752, a wireless module 753, and the antenna 754. The microcomputer 751 controls the wireless module 753 which wirelessly transmits transmission data, by using the memory 752 as a storage area during processing. Furthermore, the microcomputer 751 controls a behavior of the sound IC 707 in response to data from the game apparatus 12 received by the wireless module 753 via the antenna 754. The sound IC 707 processes sound data and the like transmitted from the game apparatus 12 via the communication section 75.

Outputted to the microcomputer 751 are: operation signals (core key data) from the operation sections 72 that is provided in the core unit 70, an acceleration signal (core acceleration data) from the acceleration sensor 701; and process result data from the imaging information calculation section 74. Furthermore, operation signals (sub key data) from the operation sections 78 that is provided in the subunit 76, and an acceleration signal (sub acceleration data) from the acceleration sensor 761, are outputted to the microcomputer 751 via the connection cable 79. The microcomputer 751 temporarily stores each of the inputted data (core key data, sub key data, core acceleration data, sub acceleration data, and process result data) onto the memory 752 as transmission data to be transmitted to the game apparatus 12. A wireless transmission from the communication section 75 to the game apparatus 12 is conducted periodically at a predetermined time interval. Since a game process is generally performed at a cycle unit of 1/60 sec., it is necessary to collect and transmit data in a shorter cycle unit. Specifically, a process unit of the game is 16.7 ms (1/60 sec.), and a transmission interval of the communication section 75 that adopts Bluetooth (registered trademark) is 5 ms. At the time of transmitting to the game apparatus 12, the microcomputer 751 outputs, the transmission data stored in the memory 752 as a series of operation information, to the wireless module 753. Then, the wireless module 753 modulates a carrier wave having a predetermined frequency by utilizing the operation information; and radiates the resultant weak radio signal from the antenna 754; based on, for example, Bluetooth (registered trademark) technology. Thus, the core key data provided to the core unit 70 from the operation sections 72; the sub key data provided to the subunit 76 from the operation sections 78; the core acceleration data provided to the core unit 70 from the acceleration sensor 701; the sub acceleration data provided to the subunit 76 from the acceleration sensor 761; and the process result data provided from the imaging information calculation section 74; are all outputted as a weak radio signal from the core unit 70. Then, the weak radio signal is received by the wireless controller module 52 of the game apparatus 12, and the weak radio signal is demodulated and decoded in the game apparatus 12. This is how the CPU 40 of the game apparatus 12 can acquire the series of operation information (core key data, sub key data, core acceleration data, sub acceleration data, and process result data). Then, the CPU 40 of the game apparatus 12 performs a game process based on, the acquired operation information and the game program. When Bluetooth (registered trademark) technology is adopted to the communication section 75, the communication section 75 may also include a function for receiving transmission data that is wirelessly transmitted from other devices.

<Game Playing Method>

Figure 7:
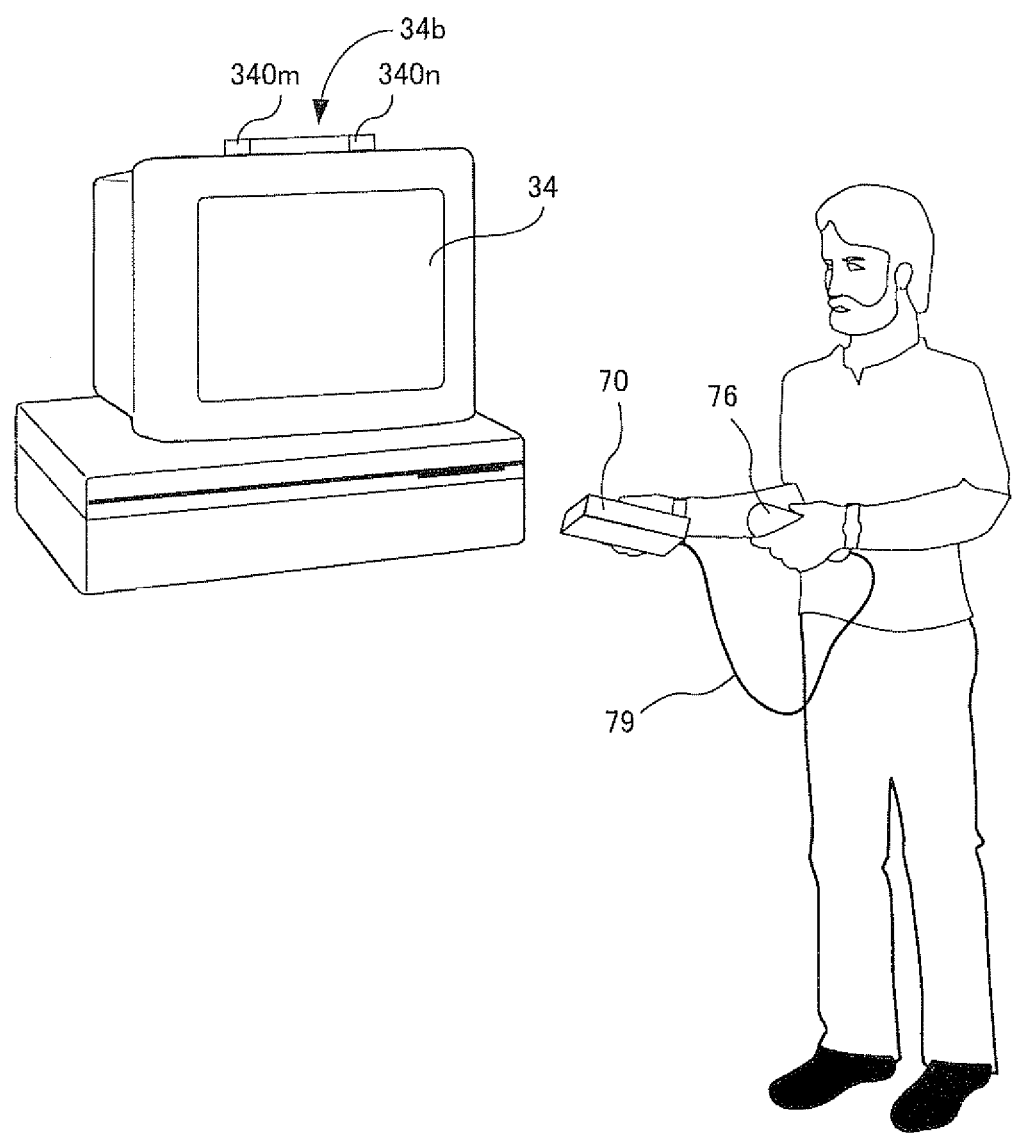
FIG. 7 illustrates a state where a game is played by a user who is using the controller 7.

FIG. 7 illustrates a state where a game is played by the user who is using the controller 7. As shown in FIG. 7, when playing a game with the video game system 10 by using the controller 7, the user holds the core unit 70 in one hand (e.g. right hand) and holds the subunit 76 in the other hand (e.g. left hand).

As described above, the inclination, the attitude, the position, and the motion (transporting motion, swinging motion, and the like), of the core unit 70 can be determined by using an output (core acceleration data) from the acceleration sensor 701 that is provided in the core unit 70. Thus, as a result of the user moving his/her hand holding the core unit 70, upward, downward, rightward, leftward, and the like; the core unit 70 functions as operation input means that responds to the user's hand motion and direction. Furthermore, as described above, the inclination, the attitude, the position, and the motion (transporting motion, swinging motion, and the like) of the subunit 76 can be determined by using an output (sub acceleration data) from the acceleration sensor 761 that is provided in the subunit 76. Thus, as a result of the user moving his/her hand holding the subunit 76 upward, downward, rightward, leftward, and the like; the subunit 76 functions as operation input means that responds to the user's hand motion and direction. Accordingly, motion of both hands can be inputted by having the user holding the two units, one in each hand, and operating the two units by moving both hands.

A mode, in which the controller 7 and the game apparatus 12 are connected by wireless communication, is described above. However, the controller 7 and the game apparatus 12 may also be electrically connect by a cable. In this case, the cable connected to the core unit 70 is also connected to a connection terminal of the game apparatus 12.

Furthermore, among the core unit 70 and the subunit 76 which are a part of the controller 7, the communication section 75 is provided only to the core unit 70 in the description above. However, a communication section that transmits the transmission data to the game apparatus 12 via wireless transmission (or wired communication) may be provided to the subunit 76. Moreover, communication sections may be provided to both the core unit 70 and the subunit 76. For example, communication sections that are provided in both the core unit 70 and the subunit 76 may each wirelessly transmit transmission data to the game apparatus 12; or after the communication section 75 of the core unit 70 receives transmission data from the communication section of the subunit 76 as a wireless transmission for the core unit 70, the communication section 75 of the core unit 70 may wirelessly transmit, the transmission data of the subunit 76 together with the transmission data of the core unit 70, to the game apparatus 12. In this case, there is no need for a connection cable 79 that electrically connect the core unit 70 and the subunit 76.

<General Outline of a Game Process>

A general outline of a game process executed by the game apparatus 12 will be described below.

FIG. 8 shows one example of a game image generated by the game apparatus 12 and displayed on a screen of the monitor 34. For the current embodiment, described is a case where a race game is executed, and in this race game, a character object 80 (hereinafter, simply referred to as OBJ 80), which a bicycle with a human on the bicycle, runs in a game space in response to an operation by the user. In FIG. 8, objects of opponents and the like are not diagrammatic represented in order to simplify the description. The user operates a movement amount (motion speed) and a moving direction of the OBJ 80, by operating the controller 7.

Figure 9:
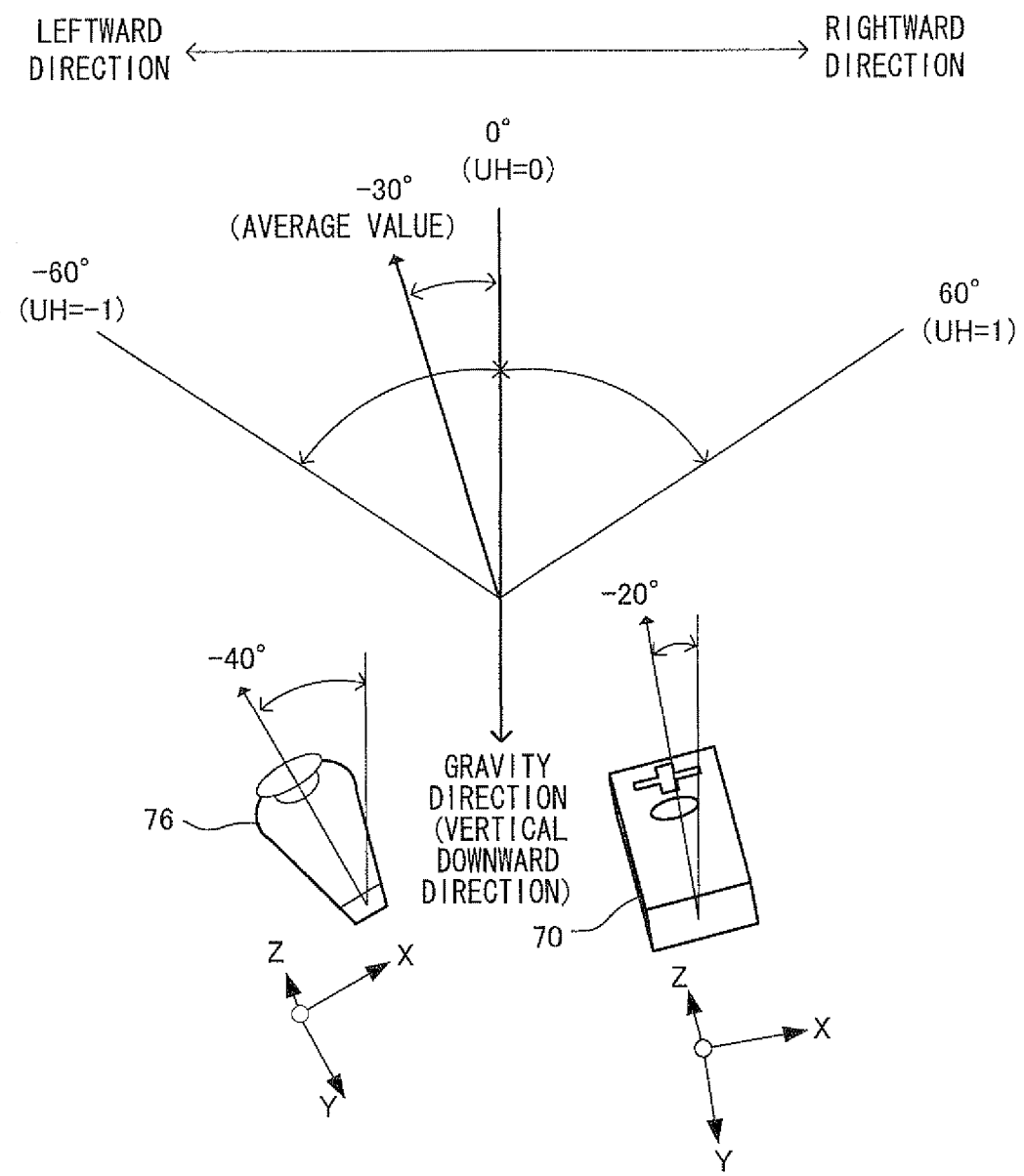
FIG. 9 shows how the user operates an OBJ 80.
Figure 10:
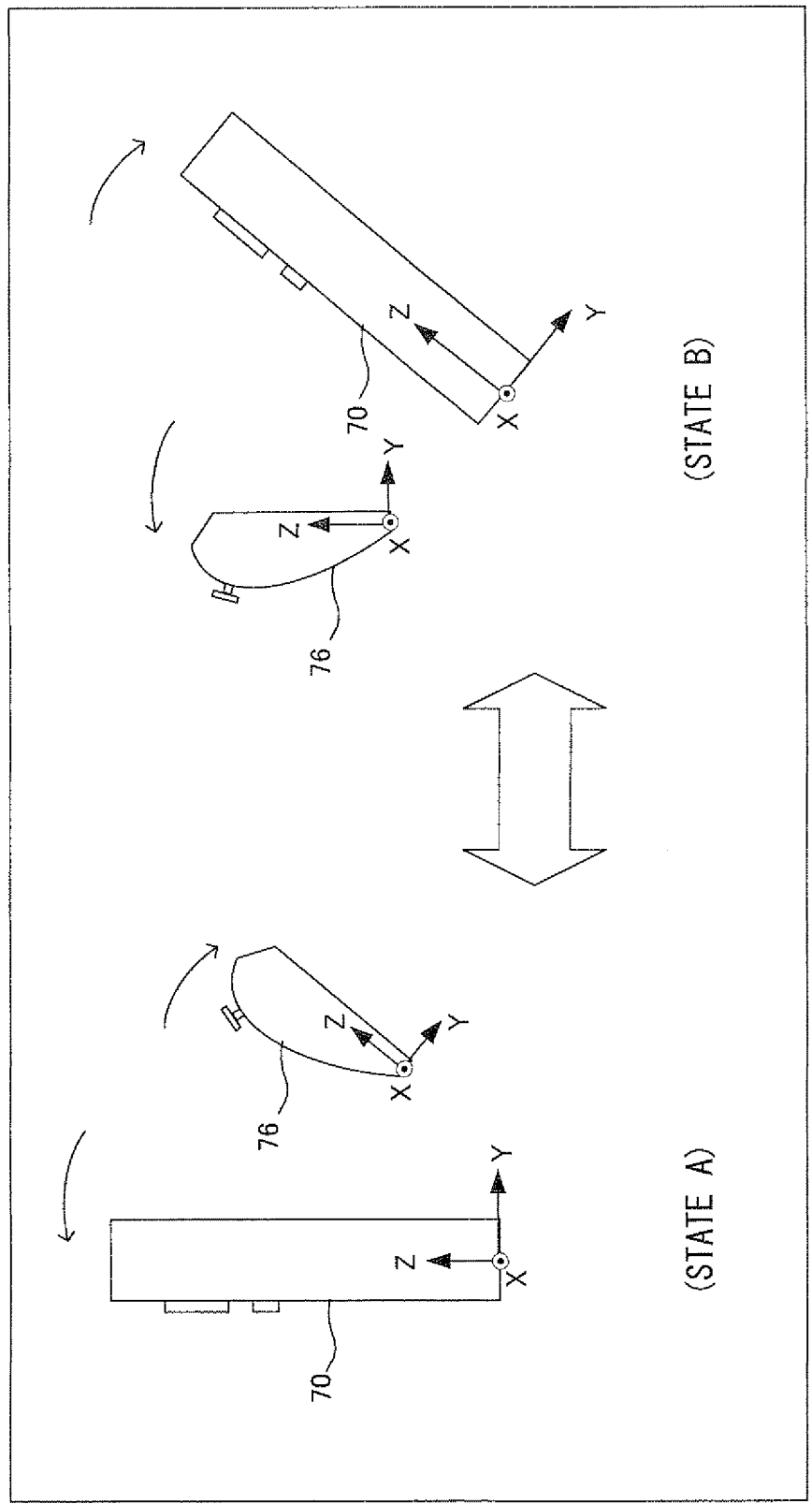
FIG. 10 also shows how the user operates the OBJ 80.

In the following, an operation method of the OBJ 80 is described with reference to FIG. 9 and FIG. 10. In FIG. 9 and FIG. 10, user's hands are not diagrammatic represented in order to simplify the description. In addition, XYZ coordination system of the core unit 70 (refer FIG. 4) and XYZ coordination system of the subunit 76 (refer FIG. 5) are indicated in FIG. 9 and FIG. 10 for convenience of the description.

First, an operation method regarding the moving direction of the OBJ 80 is described with reference to FIG. 9. The user, for example, holds the core unit 70 in the right hand and the subunit 76 in the left hand; and then holds the core unit 70 and the subunit 76 horizontally. More specifically, the user holds the core unit 70 such that the positive direction of the Y-axis of the core unit 70 points toward the gravity direction; and similarly, holds the subunit 76 such that the positive direction of the Y-axis of the subunit 76 points toward the gravity direction. Then, as shown in FIG. 9, if the user intends to point the moving direction of the OBJ 80 toward the left, the user tilts the core unit 70 and the subunit 76 toward a leftward direction using the Z-axis as an axis of rotation. Alternatively, if the user intends to point the moving direction of the OBJ 80 toward the right, the user tilts the core unit 70 and the subunit 76 toward a rightward direction. Thus, the user tilts the core unit 70 and the subunit 76 in the leftward direction in order to steer handlebars to the left and turn the OBJ 80 toward the left (refer FIG. 9); and tilts the core unit 70 and the subunit 76 in the rightward direction in order to steer the handlebars to the right and turn the OBJ 80 toward the right (hereinafter, this operation is referred to as a steering operation). In such manner, the user can conduct operations regarding the moving direction of the OBJ 80. In the description above, as shown in FIG. 9, the core unit 70 and the subunit 76 are held horizontally, and the steering operation is conducted by tilting these toward the right or the left. However, the steering operation can be conducted by holding both the core unit 70 and the subunit 76, or either one of the two, in an upright state (i.e. pointing the negative direction of the Z-axis in the vertical downward direction); and tilting these, or either one of the two, toward the right or the left. Additionally, as described in the following, the moving direction of the OBJ 80 is not determined based solely on the steering operation, but also determined based on other factors.

Next, an operation method regarding the movement amount of the OBJ 80 is described with reference to FIG. 10. If the user intends to accelerate the movement of the OBJ 80, for example, the user holds the core unit 70 in the right hand and the subunit 76 in the left hand; and alternately swings the core unit 70 and the subunit 76. More specifically, as shown in FIG. 10, the user swings the core unit 70 and the subunit 76 such that, a state A, in which the core unit 70 is held upright and the subunit 76 is tilted toward the front direction, and a state B, in which the subunit 76 is held upright and the core unit 70 is tilted toward the front direction, are repetitively alternated (hereinafter, this operation is referred to as a pedaling operation). Thus the user can accelerate and move the OBJ 80 by alternately swinging forward the core unit 70 and the subunit 76 as if alternately pressing on the pedals of the bicycle by the feet. Furthermore, the user can greatly accelerate the OBJ 80 by conducting more of this pedaling operation within a per unit of time. In the current embodiment, since the OBJ 80 is a bicycle with a human on the bicycle, the speed of the OBJ 80 gradually reduces during a period when the pedaling operation is not conducted.

Although the steering operation and the pedaling operation has been described separately above, the steering operation and the pedaling operation may be conducted simultaneously. Thus, the user may conduct the steering operation by tilting the core unit 70 and the subunit 76 right and left, while conducting the pedaling operation by swinging the core unit 70 and the subunit 76 back and forth.

(Process Details of the Game Apparatus)

Details about game processes executed by the game apparatus 12 will be described next.

Figure 11:
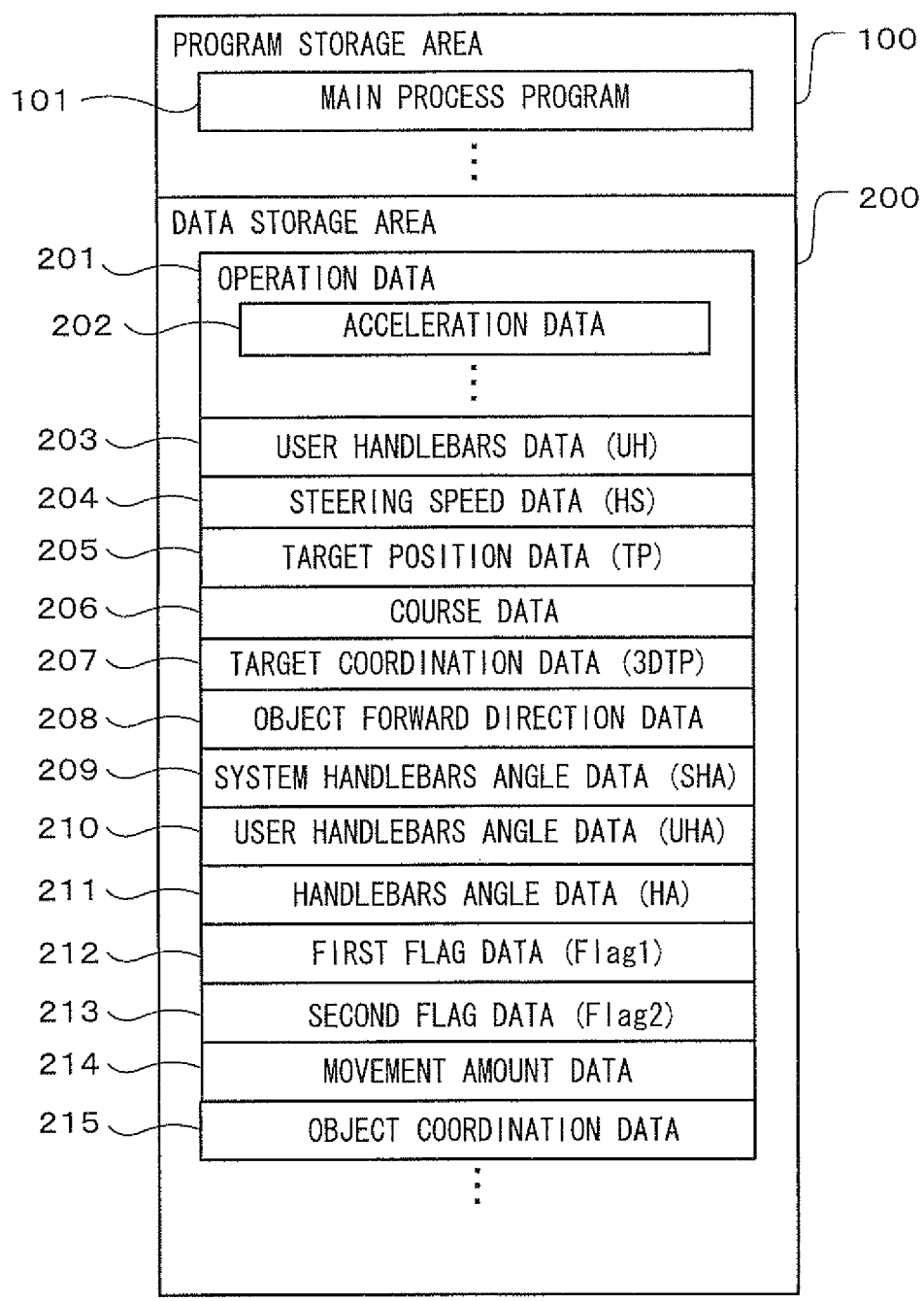
FIG. 11 shows a memory map of an external main memory 46.

FIG. 11 shows a memory map of an external main memory 46. In the current embodiment, an example, in which the CPU 40 executes a game process by using the external main memory 46, is described. However, it is not limited to this manner, and the CPU 40 may execute the game process by using the internal main memory 42e. A game program and image data, stored on the optical disc 18 are loaded on the external main memory 46. The game program and the image data may be provided to the game apparatus 12, not just from the optical disc 18, but also from other arbitrary computer readable storage medium, or a network of wired or wireless communication. As shown in FIG. 11, the external main memory 46 includes a program storage area 100 and data storage area 200.

Stored in the program storage area 100 is a game program such as a main process program 101 or the like which executes the processes in a flowchart shown in FIG. 12, which will be described later, and the like.

Stored in the data storage area 200 are data such as, operation data 201, user handlebars data 203, steering speed data 204, target position data 205, course data 206, target coordination data 207, object forward direction data 208, system handlebars angle data 209, user handlebars angle data 210, handlebars angle data 211, first flag data 212, second flag data 213, movement amount data 214, object coordination data 215, and the like.

The operation data 201 is data acquired from the controller 7, and includes acceleration data 202.

The acceleration data 202 are the core acceleration data indicating the acceleration of the core unit 70 and the sub acceleration data indicating the acceleration of the subunit 76, which are both described above. The wireless controller module 52 included in the game apparatus 12 receives acceleration data included in operation data (input data) transmitted from the controller 7 per every predefined cycle (e.g. every ½₀₀ second). The received acceleration data is stored in a buffer which is not diagrammatic represented, and which is included in the wireless controller module 52. Then, the acceleration data stored in the buffer described above is read out per every single frame which is a game process cycle, (e.g. every ⅙₀ second); and the acceleration data 202 in the external main memory 46 is updated.

As described above, since the cycle for receiving the operation data and the process cycle are different, operation data received at a plurality of time points are described in the buffer described above. In a process at step 121 which is described in the following with reference to FIG. 13, as one example, among the operation data receive at a plurality of time points, the latest operation data is used. Additionally, in processes at step 131 and 134, which are described in the following with reference to FIG. 20, among the operation data received at a plurality of time points, as one example, the most recent three operation data are used. Furthermore, in a process flow described in the following, although the acceleration data 202 is updated per every single frame which is the game process cycle; the acceleration data 202 may be updated in another process cycle.

The user handlebars data 203 is data indicating a numerical value UH which is not less than −1 and not more than 1, and which is calculated based on the steering operation by the user described in FIG. 9. As discussed in greater detail below, when the steering operation by the user indicates: straight ahead, then UH becomes 0; a left turn, then UH becomes a negative value; a right turn, then UH becomes a positive value. Furthermore, the user handlebars data 203 is data indicating the latest UH and the UH immediately prior to the latest UH which are respectively calculated from processes at the two most recent frames (most recent two game process cycles).

The steering speed data 204 is data indicating a numerical value HS which is not less than 0 and not more than 1, and which represents an absolute value of the difference between the latest UH and the UH immediately prior to the latest UH indicated by the user handlebars data 203. HS is corrected to become a numerical value that falls within a range from 0 to 1, and is corrected as HS=1 when HS exceeds 1.

The target position data 205 is data indicating a numerical value TP which is not less than −1 and not more than 1, and which represents a position of a target 300 that will be described later.

The course data 206 is data for specifying a pathway in which the OBJ 80 runs. Specifically, the course data 206 is data that indicates: a course vector 90 (refer FIG. 14 and the like) which represents the three-dimensional shape of the pathway (uphill, downhill, straight, right turn, left turn, and the like), and a direction where the OBJ 80 should proceed (hereinafter, referred to as course forward direction); a width of the pathway; and the like.

The target coordination data 207 is data indicating a three-dimensional coordination 3DTP which represents the position of the target 300 and which is a coordination on the pathway specified based on the course data 206. The target 300 is a point positioned frontward, when viewed from the OBJ 80, in the course forward direction.

The object forward direction data 208 is data indicating an angle that represents the forward direction of the OBJ 80.

The system handlebars angle data 209 is data indicating an angle SHA which is calculated based on the object forward direction data 208, the object coordination data 215, and the target coordination data 207.

The user handlebars angle data 210 is data obtained by converting the user handlebars data 203, which is not less than −1 and not more than 1 and which indicates the numerical value UH, into data which indicate an angle UHA.

The handlebars angle data 211 is data indicating an angle HA which represents the moving direction of the OBJ 80, and which is calculated based on the user handlebars angle data 210 and the system handlebars angle data 209.

The first flag data 212 is data indicating Flag 1 which is used for judging whether or not the user is conducting the pedaling operation (refer FIG. 10).

Similarly, the second flag data 213 is data indicating Flag 2 which is used for judging whether or not the user is conducting the pedaling operation.

The movement amount data 214 is data indicating a movement amount per unit of time (motion speed) of the OBJ 80 determined based on the pedaling operation by the user.

The object coordination data 215 is data indicating a three-dimensional coordination which represents a position of the OBJ 80 after a movement and which is calculated based on the handlebars angle data 211 and the movement amount data 214.

(Main Process)

With reference to the flowcharts in FIG. 12, FIG. 13, FIG. 20, and FIG. 21, flows of processes execute by the CPU 40 based on the main process program 101 will be described in the following. In FIG. 12, FIG. 13, FIG. 20, and FIG. 21, each step executed by the CPU 40 is abbreviated as "S".

Figure 12:
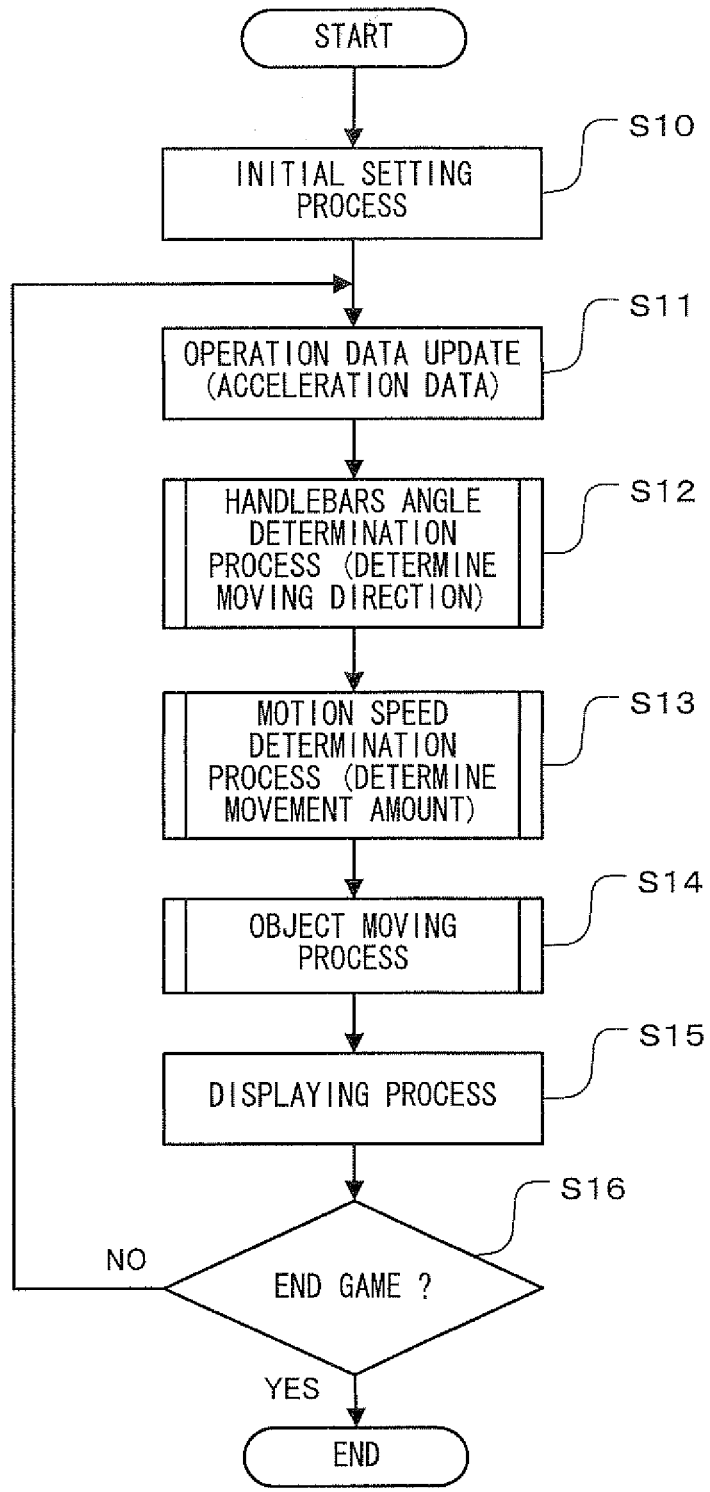
FIG. 12 is a flowchart that describes a flow of processes executed by a CPU 40 based on a main process program 101.

First, when the execution of the game program starts, the CPU 40 executes an initial setting process at step 10 in FIG. 12. Each of the data in the external main memory 46 is configured to initial values by the initial setting process. Specifically, by the initial setting process, the OBJ 80 is placed at the starting point in the game space, and each of the data in the external main memory 46 are configured with initial values indicating this state. Furthermore, by the initial setting process, an initial value for Flag 1 which is indicated by the first flag data 212, and an initial value for Flag 2 which is indicated by the second flag data 213, are both configured as "off".

Next, at step 11, the CPU 40 updates the operation data 201 in the external main memory 46. As already described, the operation data 201 includes: the core acceleration data indicating the most recent three accelerations of the core unit 70; and the sub acceleration data indicating the most recent three accelerations of the subunit 76.

Next, at step 12, the CPU 40 performs a handlebars angle determination process. The handlebars angle determination process at step 12 will be described in the following with reference to FIG. 13.

First, at step 121, the CPU 40 calculates the user handlebars data 203 and stores the user handlebars data 203 in the external main memory 46. A specific description is given with reference to FIG. 9 in the following. First the CPU 40 calculates the inclination angle in the left-right direction of the core unit 70 against the gravity direction, by using the latest core acceleration data included in the operation data 201 and updated at step 11. This calculation can be conducted, for example, by using static accelerations, which are included in the latest core acceleration data, along the Y-axis and the X-axis. Since an acceleration detected when the core unit 70 is motionless is a gravitational acceleration, the inclination angle of the core unit 70 can be calculated from the Y-axis component and the X-axis component of an acceleration during when the core unit 70 is assumed not to be moving very much. By applying this method, the inclination of the core unit 70 in the left-right direction can be calculated even when the core unit 70 is tilted toward, for example, the front direction as shown in FIG. 9. Similarly, the CPU 40 calculates the inclination angle in the left-right direction of the subunit 76 against the gravity direction, by using the latest sub acceleration data included in the operation data 201 updated at step 11. In the example in FIG. 9, the inclination angle of the core unit 70 is −20°; and the inclination angle of the subunit 76 is −40°. Next, the CPU 40 calculates an average value of the calculated inclination angle of the core unit 70 and the calculated inclination angle of the subunit 76 (hereinafter, referred to as handlebars average angle). The handlebars average angle is −30° in the example in FIG. 9. Next, the CPU 40 converts the handlebars average angle into the user handlebars data 203 indicating the numerical value UH which is not more than −1 and not more than 1. Specifically, when the handlebars average angle is 0°, this angle is converted into user handlebars data 203 indicating UH=0; when the handlebars average angle is −60°, this angle is converted into user handlebars data 203 indicating UH=−1; and when the handlebars average angle is 60°, this angle is converted into user handlebars data 203 indicating UH=1. Since the handlebars average angle is −30° in the example in FIG. 9, this angle is converted into user handlebars data 203 indicating UH=−0.5. At this point, if the handlebars average angle is a value smaller than −60°, the handlebars average angle is corrected to be −60°; and if the handlebars average angle is a value larger than 60°, the handlebars average angle is corrected to be 60°. In such manner, the handlebars average angle is adjusted to be a value not less than −60° and not more than 60°. The adjustment of the handlebars average angle is not limited only to this range, and, for example, may be adjusted to be a value not less than −45° and not more than 45°. In such a case, when the handlebars average angle is −45°, this angle is converted into user handlebars data 203 indicating UH=−1; and when the handlebars average angle is 45°, this angle is converted into user handlebars data 203 indicating UH=1.

Here, while also described later with reference to FIG. 20, dynamic accelerations of the core unit 70 and the subunit 76 are used in order to detect the pedaling operation (refer FIG. 10) by the user. Thus, the pedaling operation is detected based on acceleration data when the core unit 70 and the subunit 76 are assumed to be moving. Since the dynamic acceleration (acceleration based on motion) and the static acceleration (gravitational acceleration) cannot be separated out from the acceleration data, the acceleration data when the core unit 70 and the subunit 76 are assumed not to be moving very much is defined as the static acceleration, and the acceleration data when the core unit 70 and the subunit 76 are assumed to be moving extensively is defined as the dynamic acceleration. For example, acceleration data, obtained when accelerations of the core unit 70 and the subunit 76 settle within a predefined fluctuation range for a predefined number of times (e.g. three times) of frame processing, can be used as the static accelerations (Y-axis component and X-axis component of the gravitational acceleration) of the core unit 70 and the subunit 76 for calculating the above described user handlebars data 203.

Next, at step 122, the CPU 40 calculates the steering speed data 204, and stores the steering speed data 204 in the external main memory 46. Specifically, first, the CPU 40 acquires, from the external main memory 46, the latest UH calculated by the process at the present step 121, and the immediately preceding UH calculated by the process at the immediately preceding step 121. Then, the CPU 40 calculates the difference between the two acquired UHs, obtains the absolute value of this difference, and defines this absolute value as HS. HS is adjust to become a numerical value that falls within a range from 0 to 1, and is corrected as HS=1 when HS exceeds 1.

Next, at step 123, the CPU 40 calculates the target position data 205, and stores the target position data 205 in the external main memory 46. A specific description is provided in the following. First, the CPU 40 acquires, from the external main memory 46: TP calculated by the process at the immediately preceding step 123; UH calculated by the process at the present step 121; and HS calculated by the process at the present step 122. Then, the CPU 40 obtains TP (left side of formula 1 described below) that should be calculated by the process at the present step 123, by assigning the acquire TP, UH, and HS in the right side of the formula 1 described below.

$$TP = TP + (UH - TP)HS \quad (1)$$

Next, the CPU 40 updates the target position data 205 in the external main memory 46 with TP calculated by the present process. TP is adjusted to be a numerical value that falls within a range from −1 to 1, by correcting TP as TP=−1 when TP is smaller than −1 and by correcting TP as TP=1 when TP exceeds 1. By calculating TP as described above: a drastic change can be applied to the position of the target when the user rapidly changes the direction; and conversely, an influence of a minute change of the direction is not reflected so much. Therefore, an operation capable of easily reflecting the user's intention can be applied to an operation that requires delicate adjusting, particularly when controlling the direction based on acceleration, as in the current embodiment.

Figure 14:
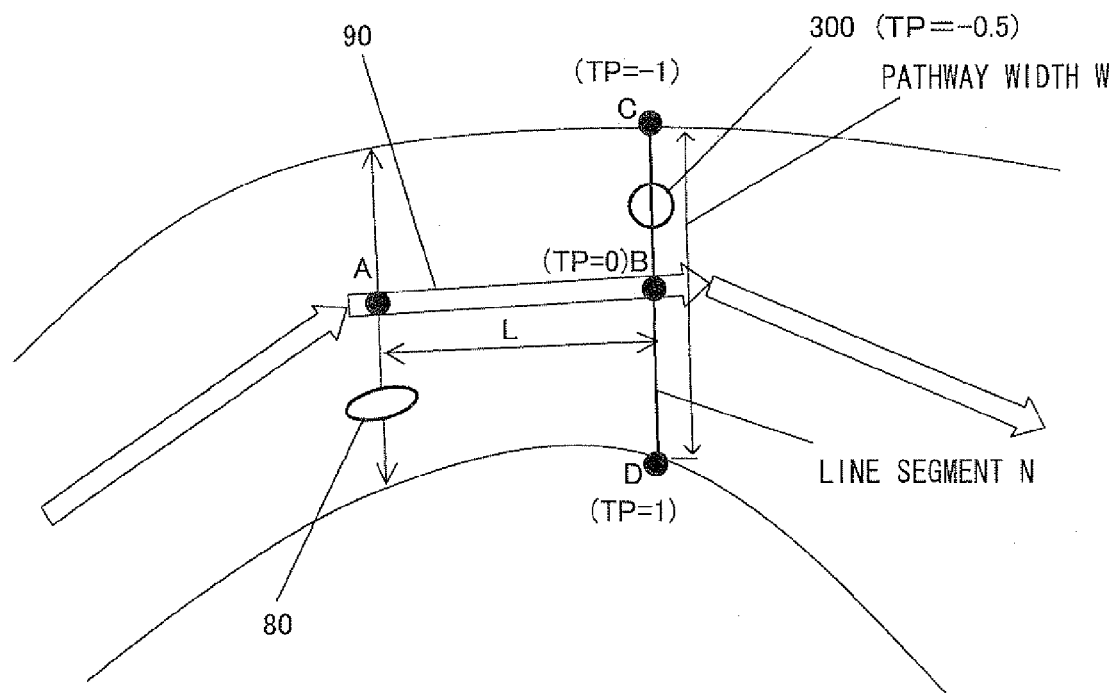
FIG. 14 is a figure for describing a handlebars angle determination process.

Next, at step 124, the CPU 40 calculates the target coordination data 207 and stores the target coordination data 207 in the external main memory 46. The target coordination data 207 is data indicating the three-dimensional coordination 3DTP of the target 300. A specific description of the process at step 124 is provided in the following with reference to FIG. 14. FIG. 14 is a schematic diagram of the game space when viewed from above. As shown in FIG. 14, the pathway, in which the OBJ 80 runs, is specified by the course vector 90, a pathway width W, and the like; and the target 300 is allocated within this pathway. First, the CPU 40 draws a perpendicular line from a position of the OBJ 80 to the course vector 90; and calculates a coordination of an intersection point A of this perpendicular line and the course vector 90. Next, the CPU 40 calculates a coordination of point B which is located frontward of the intersection point A in the course direction for a predefined distance L. Next, the CPU 40 obtains a line segment N. The line segment N is a line segment which orthogonally intersects at the center thereof with the course vector 90 at point B, and which reaches both side ends of the pathway, and which length is equal to the pathway width W. Next, the CPU 40 acquires the latest TP updated at step 123 from the external main memory 46. Next, the CPU 40 calculates a coordination on the line segment N corresponding to the acquired TP, and defines the calculated coordination as 3DTP. Specifically, when TP=0, 3DTP is at the coordination of point B; when TP=−1, 3DTP is at the coordination of point C which is on the left side end of the pathway; and when TP=1, 3DTP is at the coordination of point D which is on the right side end of the pathway. In the example in FIG. 14, since TP=−0.5, 3DTP is at the coordination of a midpoint of point B and point C. It is preferred if target 300 is actually not drawn in a displayed image (game image).

Figure 15:
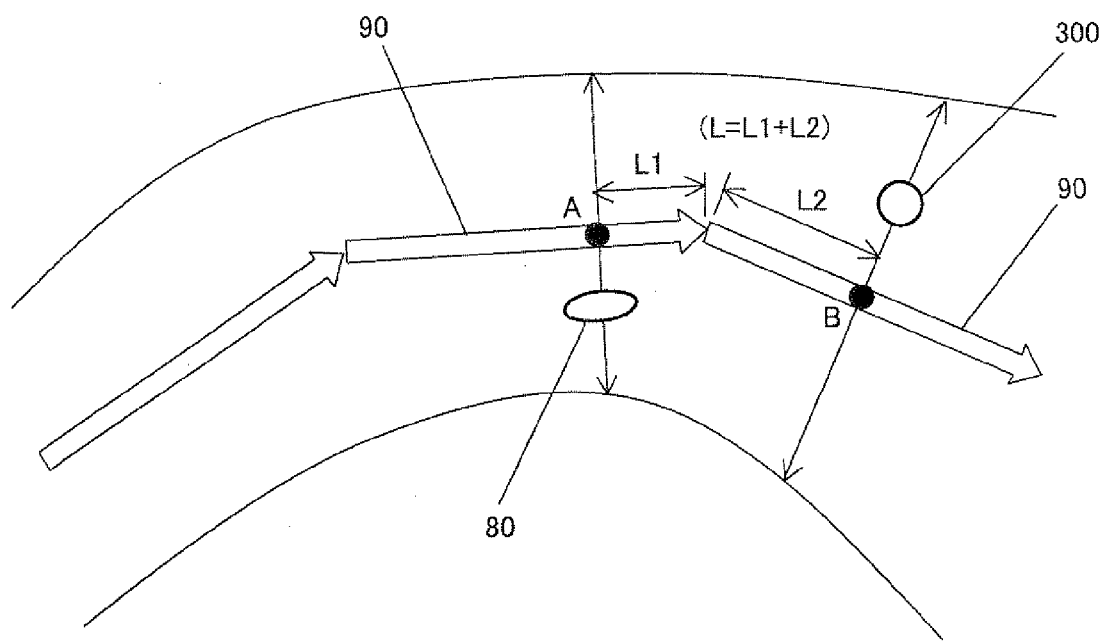
FIG. 15 is also a figure for describing the handlebars angle determination process.
Figure 16:
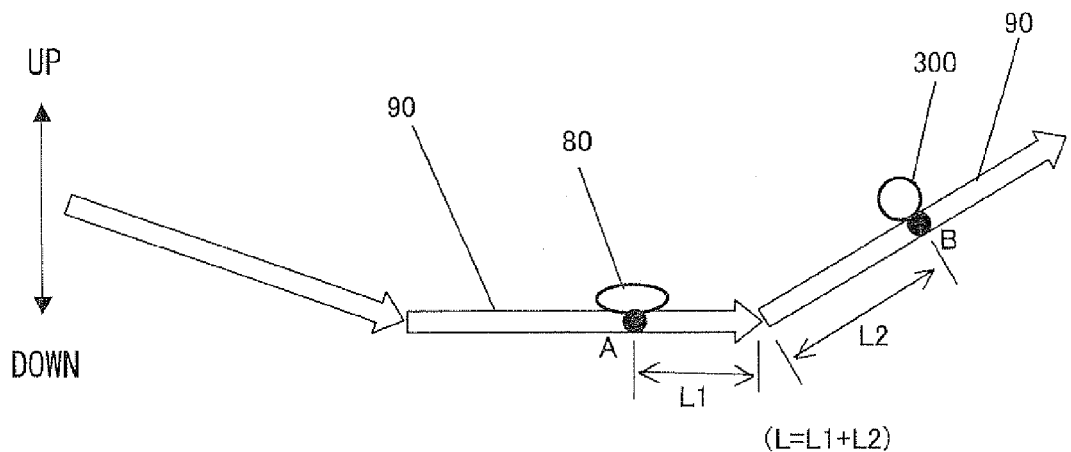
FIG. 16 is also a figure for describing the handlebars angle determination process.

FIG. 15 and FIG. 16 are figures for describing cases where the intersection point A and point B exist on different course vectors 90 at step 124. FIG. 15 is a schematic diagram of a game space when viewed from above, and corresponds to FIG. 14. As shown in FIG. 15, the predefined distance L is a sum of L1 and L2, when the intersection point A and point B exist on different course vectors 90. FIG. 16 is a schematic diagram of a game space when viewed from a side surface and when the pathway sways up and down in the vertical direction. Similarly, the predefined distance L is also a sum of L1 and L2 in this case.

In FIG. 14 and FIG. 15, described are cases where the pathway and a range in which the target 300 is positioned are equal. However, the pathway and the range in which the target 300 is positioned do not have to be equal. For example, a width of the range in which the target 300 is positioned may be larger than the width of the pathway. In this case, there is a possibility that the target 300 is positioned outside the pathway. Furthermore, for example, a width of the range in which the target 300 is positioned may be smaller than the width of the pathway. In this case, the target 300 will be positioned in a range having a predefined width that is narrower than the width of the pathway, which width is derived by defining the center of the pathway as the center of the width.

Figure 17:
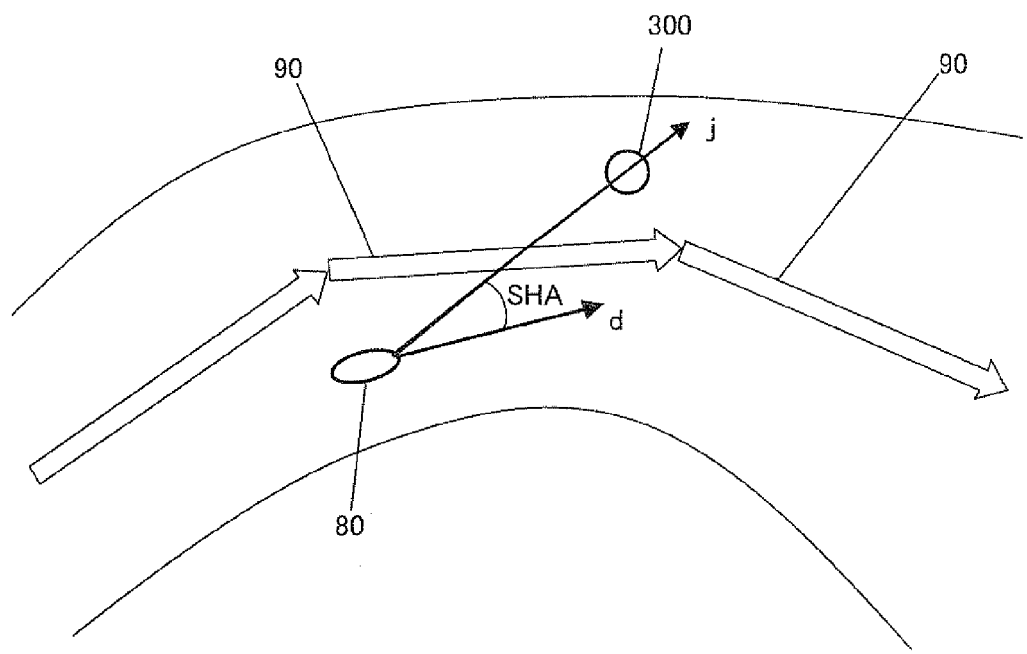
FIG. 17 is also a figure for describing the handlebars angle determination process.

Next, at step 125, the CPU 40 calculates the system handlebars angle data 209 based on the object forward direction data 208, the object coordination data 215, and the target coordination data 207; and stores the system handlebars angle data 209 in the external main memory 46. A specific description of the process at step 125 is provided in the following with reference to FIG. 17. FIG. 17 is a schematic diagram of a game space when viewed from above, and shows a state identical to the state represented in FIG. 14. First, the CPU 40 acquires, from the external main memory 46: the object forward direction data 208 indicating the forward direction of the OBJ 80; the latest object coordination data 215 indicating the position of the OBJ 80; and the target coordination data 207 calculated at the present step 124. The object coordination data 215 is data calculated by the process (immediately preceding process) at step 14 in FIG. 12 which is described in the following. Next, the CPU 40 calculates a target direction j from the OBJ 80 toward the target 300 by using the acquired object coordination data 215 and target coordination data 207. Next, the CPU 40 calculates an angle between the calculated target direction j and a forward direction d of the OBJ 80 indicated by the acquired object forward direction data 208, as SHA indicated by the system handlebars angle data 209.

Next, at step 126, the CPU 40 converts the user handlebars data 203 into the user handlebars angle data 210. Namely the CPU 40 converts the numerical value UH which is within a range from −1 to 1, into UHA which represents an angle. Described in the following is one example where UHA is a value not less than −45° and not more than 45°. For example, the CPU 40: converts UH into UHA=−45° when UH=−1; converts UH into UHA=−22.5° when UH=−0.5; converts UH into UHA=0° when UH=0; converts UH into UHA=22.5° when UH=0.5; and converts UH into UHA=45° when UH=1.

Next, at step 127, the CPU 40 determines the handlebars angle data 211 based on the user handlebars angle data 210 and the system handlebars angle data 209, and stores the handlebars angle data 211 in the external main memory 46. A specific description of the process at step 127 is provided in the following. First, the CPU 40 acquires, from the external main memory 46: the user handlebars angle data 210 (UHA) calculated at the present step 126; and the system handlebars angle data 209 (SHA) calculated at the present step 125. Next, the CPU 40 calculates the handlebars angle data 211 (HA) by using the formula 2 described below.

$$HA = SHA(1-t) + UHA \times t \quad (2)$$

Figure 18:
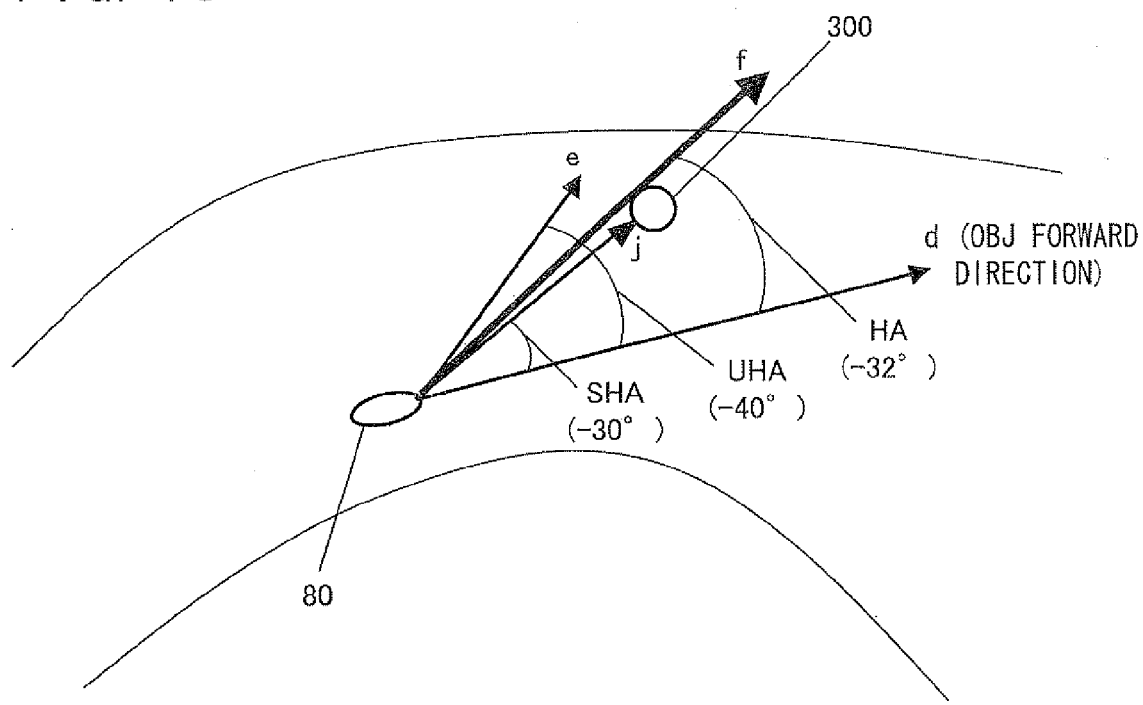
FIG. 18 is also a figure for describing the handlebars angle determination process.
Figure 19:
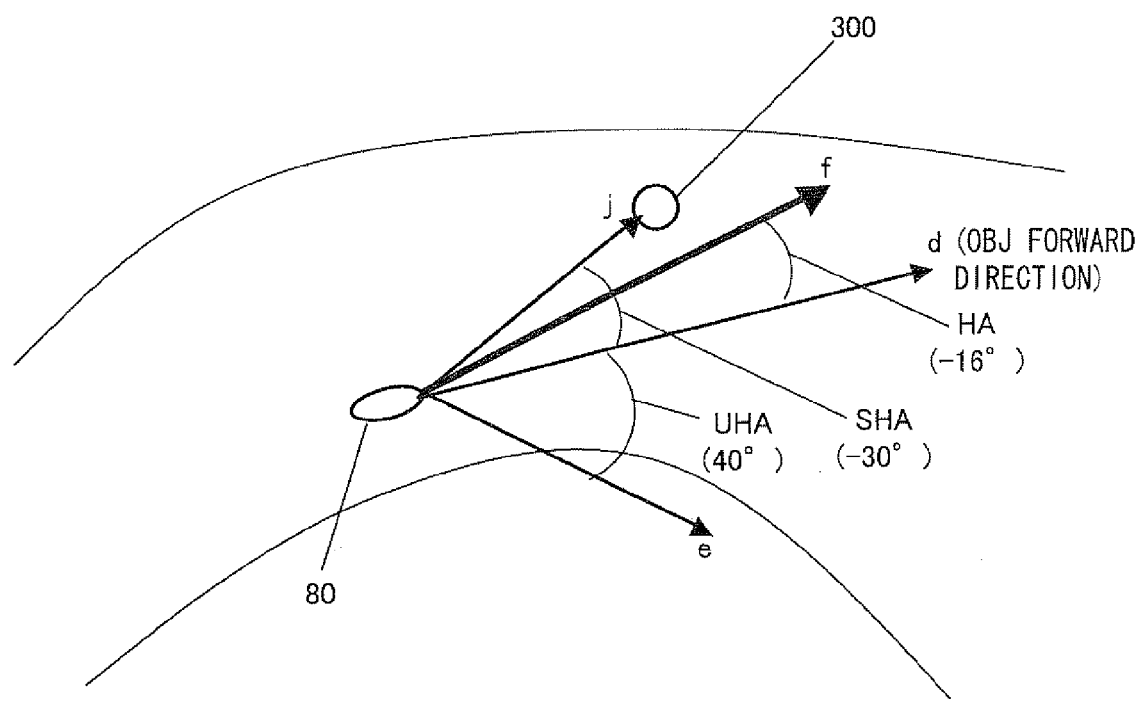
FIG. 19 is also a figure for describing the handlebars angle determination process.

Here, t is a constant number of $0 \leq t < 1$, and it is a constant number that defines the degree of influence that the user's steering operation has on a steering angle of the OBJ 80 (i.e. moving direction). The larger t is, the larger the influence on the steering angle of the OBJ 80 by the user's steering operation is. In the following, t=0.2 is used as one example. A more specific description is provided in the following with reference to FIG. 18 and FIG. 19. In FIG. 18 and FIG. 19, direction d is the forward direction of the OBJ 80 indicated by the object forward direction data 208; direction j is a direction indicated by the system handlebars angle data 209 (SHA) (which is a direction from the OBJ 80 toward the target 300); direction e is a direction indicated by the user handlebars angle data 210 (UHA); and direction f is a direction indicated by the handlebars angle data 211 (HA). FIG. 18 and FIG. 19 shows a state identical to the state represented in FIG. 17. As shown in FIG. 18, when UHA=−40° and SHA=−30°, then HA=−32°. Additionally, as shown in FIG. 19, when UHA=40° and SHA=−30°, then HA=−16°. As shown above, HA becomes a value between UHA and SHA, or a value equal to SHA, depending on the constant number t. For example, HA becomes: a value in the middle between UHA and SHA when t=0.5; a value closer to SHA than the middle between UHA and SHA when t is smaller than 0.5; and a value closer to UHA than the middle between UHA and SHA when t is larger than 0.5.

Figure 13:
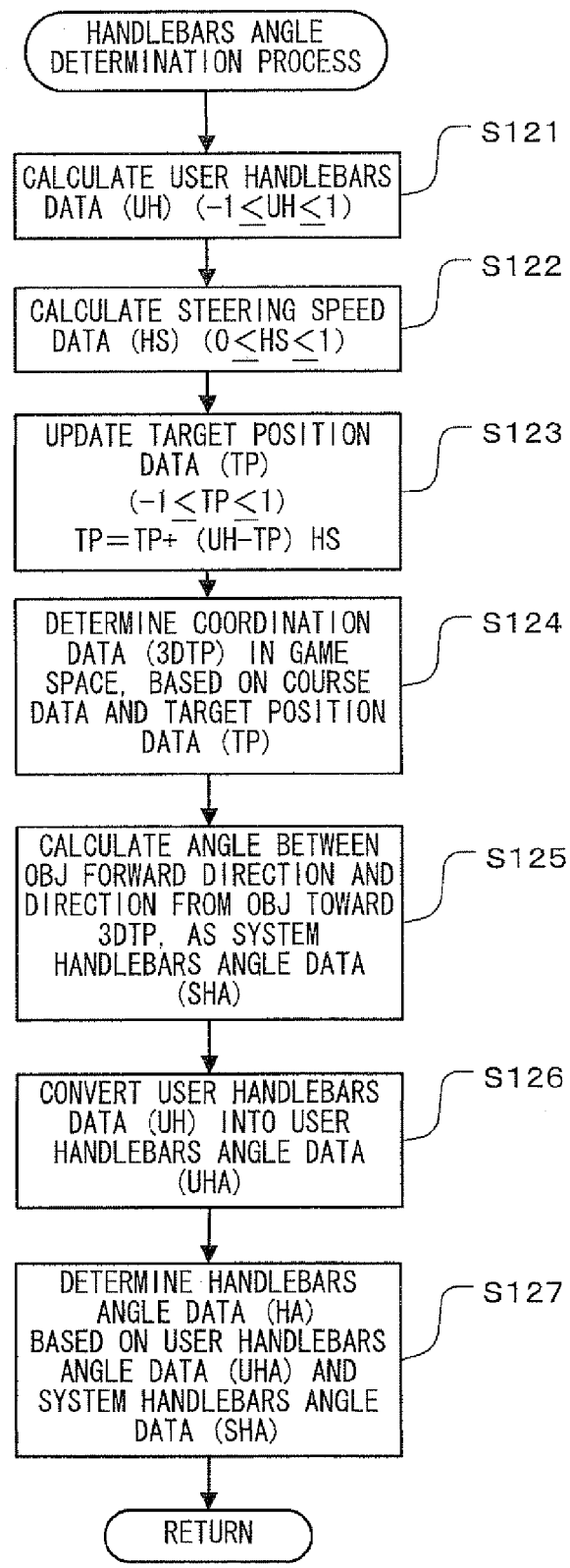
FIG. 13 is also a flowchart that describes a flow of processes executed by the CPU 40 based on the main process program 101.

As a result of the processes from step 121 to step 127 in FIG. 13 described above, the handlebars angle data 211 (HA) is determined. As described above, when the OBJ 80 is intended to travel along the pathway, as a result of configuring the system handlebars angle (SHA), a control in response to an input by the user can be conducted while enabling the OBJ 80 to travel along the pathway to some extent, by allowing the user to control, within a defined range, a relative position from the pathway. Furthermore, the user can easily recognize that his/her input is reflected in the control even while the travel along the pathway is maintained to some extent, since a component, which is directly influenced by the user's input, is included as a component of the traveling direction, by calculating the final handlebars angle (HA) from the system handlebars angle (SHA) and the user handlebars angle (UHA) as described above. The user can enjoy the feeling of having his/her input being reflected in the operation while suppressing operation errors, especially in a game that requires a delicate control, particularly when controlling the direction based on acceleration, as in the current embodiment.

Next, at step 13 in FIG. 12, the CPU 40 conducts a motion speed determination process of the OBJ 80 by utilizing the operation data 201 updated at step 11. The process at step 13 is a process which detects the pedaling operation, described above with reference to FIG. 10, by the user; and which determines the motion speed (movement amount per unit of time) of the OBJ 80. The motion speed determination process at step 13 will be described in the following with reference to a flowchart in FIG. 20.

First, at step 131, the CPU 40 detects a peak of the acceleration of the core unit 70, by using the most recent three core acceleration data included in the operation data 201 and updated at step 11 in FIG. 12. Here, the latest core acceleration data is referred to as a first core acceleration data; the second latest core acceleration data is referred to as a second core acceleration data; and the third latest core acceleration data is referred to as a third core acceleration data. A specific description is provided in the following. First, the CPU 40 acquires, from among the first core acceleration data, an acceleration Ay1 in the Y-axis direction and an acceleration Az1 in the Z-axis direction, both of the core unit 70 and shown in FIG. 10. Next, the CPU 40 calculates an acceleration Ayz1 by using formula 3 described below.

$$Ayz1 = 0.3 \times Ay1 + 0.7 \times Az1 \quad (3)$$

Here, the user generally conducts the pedaling operation in FIG. 10, by swinging the core unit 70 back and forth while using his/her elbow as a fulcrum point. Therefore, in order to efficiently detect the pedaling operation, Ay1 is multiplied by 0.3 and Az1 is multiplied by 0.7 in formula 3 described above. During a swing, a centrifugal force applied in the Z-axis direction, and an acceleration applied in the Y-axis direction, which occurs especially at the start and end of a swing, are detected; and detection of an acceleration is conducted in the condition described above, due to an assumption that detection of the centrifugal force contributes in better detection of a swing. The constant numbers multiplied to Ay1 and Az1 are not limited to those in formula 3, and other constant numbers can be used as long as they are suited for detecting the pedaling operation. Similarly, the CPU 40: acquires, from among the second core acceleration data, an acceleration Ay2 in the Y-axis direction and an acceleration Az2 in the Z-axis direction, both of the core unit 70 and shown in FIG. 10; and similarly calculates an acceleration Ayz2. Similarly, the CPU 40: acquires, from among the third core acceleration data, an acceleration Ay3 in the Y-axis direction and an acceleration Az3 in the Z-axis direction, both of the core unit 70 and shown in FIG. 10; and similarly calculates an acceleration Ayz3. Next, the CPU 40 detects a peak by using the calculated Ayz1, Ayz2, and Ayz3. One example of a detection method of this peak is described in the following. CPU 40 judges whether $Ayz3 \leq Ayz2$ and $Ayz2 \geq Ayz1$ are both satisfied or not. If $Ayz3 \leq Ayz2$ and $Ayz2 \geq Ayz1$ are both satisfied, a peak is detected (YES at step 131); and then the process proceeds to step 132. On the other hand, if $Ayz3 \leq Ayz2$ and $Ayz2 \geq Ayz1$ are both not satisfied, a peak is not detected (NO at step 131); and then the process proceeds to step 134. Although a local maximum is detected as a peak in the description above, a local minimum can also be detected as a peak. In such a case, the CPU 40 judges whether $Ayz3 \geq Ayz2$ and $Ayz2 \leq Ayz1$ are both satisfied or not.

At step 132, the CPU 40 confirms whether Flag 1 indicated by the first flag data 212 is "on" or not. If Flag 1 is "on" (YES at step 132), the process proceeds to step 134. On the other hand, if Flag 1 is "off" (NO at step 132), the process proceeds to step 133. As a result of the initial setting process at step 10 in FIG. 12, an initial value for Flag 1 is configured as "off" at the initial setting.

At step 133, the CPU 40 turns Flag 1 indicated by the first flag data 212 "on", turns Flag 2 indicated by the second flag data 213 "off", and updates the first flag data 212 and the second flag data 213. Then, the process proceeds to step 134.

At step 134, the CPU 40 detects a peak of the acceleration of the subunit 76, by using the most recent three sub acceleration data included in the operation data 201 and updated at step 11 in FIG. 12. This process is similar to the process in step 131, which detects the peak of the acceleration of the core unit 70. Here, the latest sub acceleration data is referred to as a first sub acceleration data; the second latest sub acceleration data is referred to as a second sub acceleration data; and the third latest sub acceleration data is referred to as a third sub acceleration data. First, the CPU 40 acquires, from among the first sub acceleration data, an acceleration Ay1 in the Y-axis direction and an acceleration Az1 in the Z-axis direction, both of the subunit 76 and shown in FIG. 10. Next, the CPU 40 calculates an acceleration Ayz1 by using formula 3 used in the process at step 131. Similarly, the CPU 40: acquires, from among the second sub acceleration data, an acceleration Ay2 in the Y-axis direction and an acceleration Az2 in the Z-axis direction, both of the subunit 76 and shown in FIG. 10; and similarly calculates an acceleration Ayz2. Similarly, the CPU 40: acquires, from among the third sub acceleration data, an acceleration Ay3 in the Y-axis direction and an acceleration Az3 in the Z-axis direction, both of the subunit 76 and shown in FIG. 10; and similarly calculates an acceleration Ayz3. Next, the CPU 40 detects a peak by using the calculated Ayz1, Ayz2, and Ayz3. Description of the detection method of this peak is omitted, since it is identical to the process at step 131. If a peak is detected at step 134 (YES), the process proceeds to step 135. On the other hand, if a peak is not detected at step 134 (NO), the process proceeds to step 139.

At step 135, the CPU 40 confirms whether Flag 2 indicated by the second flag data 213 is "on" or not. If Flag 2 is "on" (YES at step 135), the process proceeds to step 139. On the other hand, if Flag 2 is "off" (NO at step 135), the process proceeds to step 136. As a result of the initial setting process at step 10 in FIG. 12, an initial value for Flag 2 is configured as "off" at the initial setting.

At step 136, the CPU 40 turns Flag 1 indicated by the first flag data 212 "off", turns Flag 2 indicated by the second flag data 213 "on", and updates the first flag data 212 and the second flag data 213. Then, the process proceeds to step 138.

At step 138, the CPU 40 adds the movement amount of the OBJ 80. Specifically, the CPU 40 adds a predefined addition movement amount per unit of time of the OBJ 60 (i.e. predefined addition speed) to a value of the movement amount data 214. For example, in the game space, a predefined addition movement amount per unit of time of the OBJ 80, 1 km/h, is added to a value of the movement amount data 214, 10 km/h, and the value of the movement amount data 214 is updated as 11 km/h. Then the process proceeds to step 14 in FIG. 12. Furthermore, depending on the status of the pathway (uphill slope, downhill slope, gravel road, paved road, and the like), state of the OBJ 80 (stamina exhaustion level and the like), and the like; the predefined addition movement amount per unit of time of the OBJ 80 described above may be different in each status or state.

On the other hand, at step 139, the CPU 40 subtracts the movement amount of the OBJ 80. Specifically, the CPU 40 subtracts a predefined subtraction movement amount per unit of time of the OBJ 80 (i.e. predefined subtraction speed) from a value of the movement amount data 214. For example, in the game space, a predefined subtraction movement amount per unit of time of the OBJ 80, 0.5 km/h, is subtracted from a value of the movement amount data 214, 10 km/h, and the value of the movement amount data 214 is updated as 9.5 km/h. Then the process proceeds to step 14 in FIG. 12. Furthermore, depending on the status of the pathway (uphill slope, downhill slope, gravel road, paved road, and the like) and the like, the predefined subtraction movement amount per unit of time of the OBJ 80 described above may be different in each status.

Figure 20:
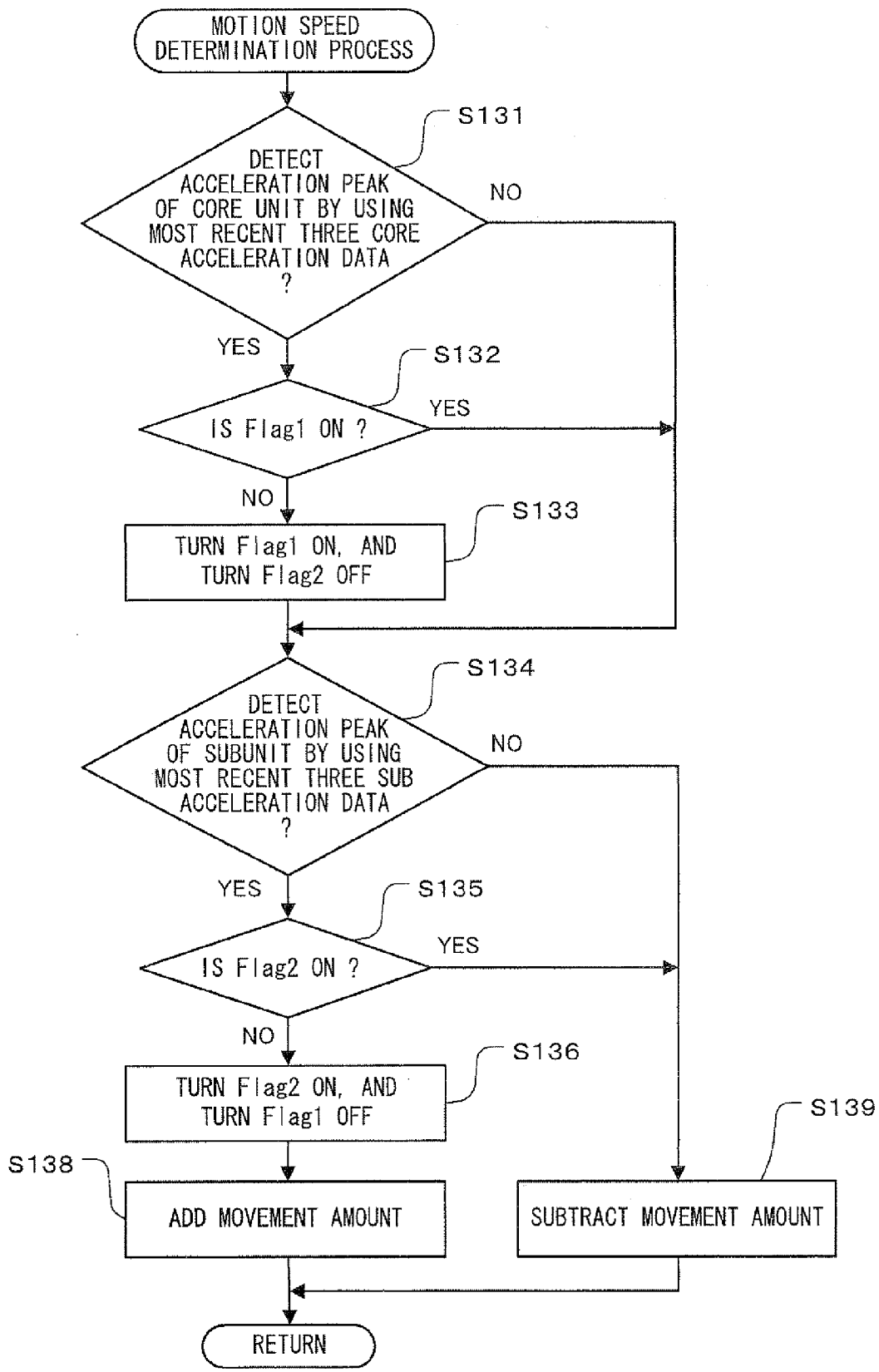
FIG. 20 is a flowchart that describes a flow of processes executed by the CPU 40 based on the main process program 101.
Figure 21:
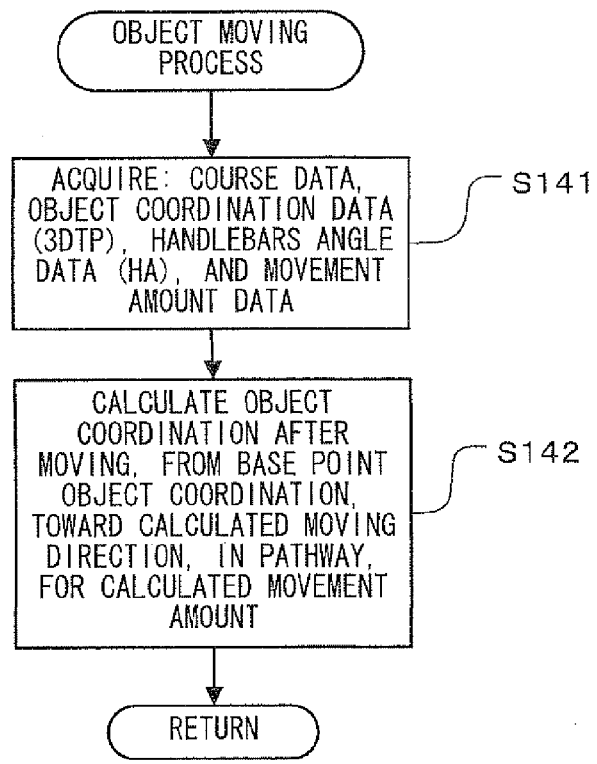
FIG. 21 is also a flowchart that describes a flow of processes executed by the CPU 40 based on the main process program 101.

As a result of the processes from step 131 to step 139 in FIG. 20 described above, the motion speed of the OBJ 80 is determined. Provided in the following is a simple description of a typical process route conducted in the flowchart in FIG. 20. If the user is not conducting the pedaling operation, the process route in FIG. 20 will proceed through step 131, 134, and 139. In this case, the motion speed of the OBJ 80 is reduced. If the user is conducting the pedaling operation, the process route in FIG. 20 will proceed from step 131 to 138. In this case, the motion speed of the OBJ 80 is increased. If the user is swinging only the core unit 70, the process route in FIG. 20 will proceed through step 131, 132, 134, and 139. In this case, the motion speed of the OBJ 80 is reduced. If the user is swinging only the subunit 76, the process route in FIG. 20 will proceed through step 131, 134, 135, and 139. In this case, the motion speed of the OBJ 80 is reduced. As described above, the user can accelerate the OBJ 80 by conducting an operation (pedaling operation) of alternately swinging forward the core unit 70 and the subunit 76 as if alternately pressing on the pedals of the bicycle.

Next, at step 14 in FIG. 12, the CPU 40 conducts an object moving process. The object moving process at step 14 will be described in the following with reference to a flowchart in FIG. 21.

First, at step 141, the CPU 40 acquires: the course data 206; the handlebars angle data 211 determined at the present step 12; the movement amount data 214 determined at the present step 13; and the object coordination data 215 determined at the immediately preceding step 14.

Figure 22:
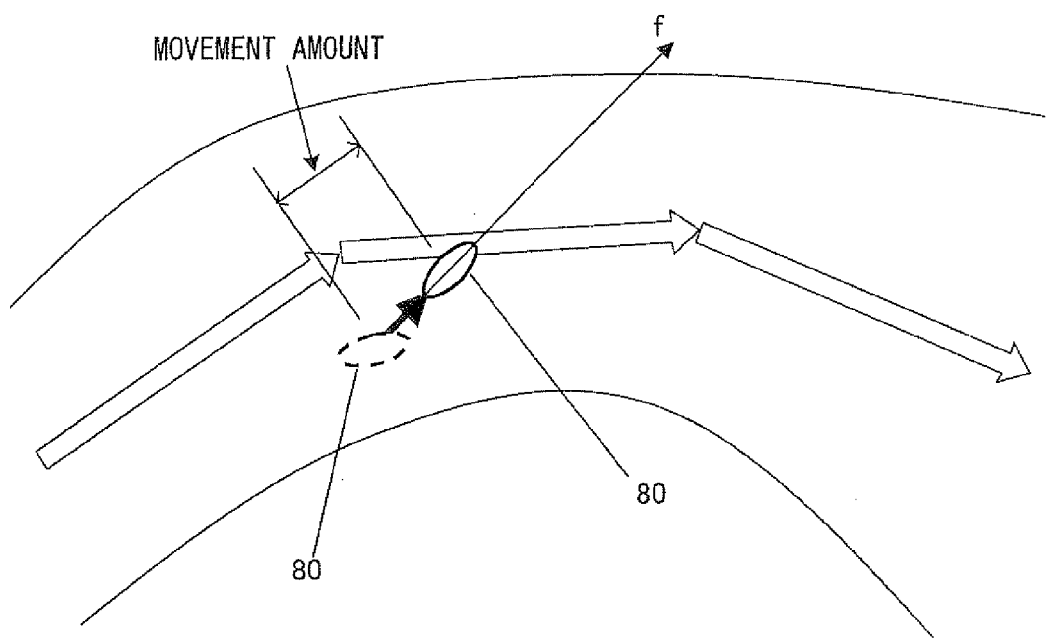
FIG. 22 is a figure for describing an object moving process.

Next, at step 142, the CPU 40: moves, within the pathway specified by the acquired course data 206, the OBJ 80 at a speed indicated by the movement amount data 214 toward a direction indicated by the handlebars angle data 211, by using a coordination 3DTP indicated by the acquire object coordination data 215 as a base point; and calculates a coordination 3DTP of the OBJ 80 after the movement and updates a value of the latest object coordination data 215 with this calculation result. A specific description is provided in the following with reference to FIG. 22. The state represented in FIG. 22 corresponds to the state represented in FIG. 18, and direction f is a direction indicated by the handlebars angle data 211. As shown in FIG. 22, as a result of the process at step 142, the OBJ 80 moves from the immediately preceding coordination toward direction f, for a determined movement amount.

As a result of the processes at step 141 and step 142 in FIG. 22 described above, a moving process of the OBJ 80 is performed. Then the process proceeds to step 15 in FIG. 12.

At step 15 in FIG. 12, the CPU 40 causes the GPU 42b (refer FIG. 2) to generate a game image based on the latest object coordination data 215 (the coordination 3DTP of the OBJ 80 after the movement) calculated at step 14, and conducts a displaying process of the game image.

Next, at step 16 in FIG. 12, the CPU 40 judges whether the game has been ended or not. If the game has been ended (YES at step 16), the CPU 40 ends the processes in the flowchart in FIG. 12. On the other hand, if the game has not been ended (NO at step 16), the process returns to step 11.

As described above, in the current embodiment, determined as the moving direction of the OBJ 80 (refer direction f in FIG. 18 and FIG. 19) is, either a direction in between a direction based on the steering operation by the user (refer direction e in FIG. 18 and FIG. 19) and a direction from the OBJ 80 toward the target 300 (refer direction j in FIG. 18 and FIG. 19), or the direction from the OBJ 80 toward the target 300. Here, as already described, the target 300 is positioned in the forward direction of the course where the OBJ 80 should proceed, at a predefined distance frontward of the OBJ 80, within a predefined width (refer FIG. 14). As a result, the moving direction of the OBJ 80 is corrected from a direction based on the steering operation by the user to a forward direction of the course where the OBJ 80 should proceed.

Furthermore, the target 300 moves for an amount that corresponds to a speed (HS) of the steering operation, in a direction (rightward direction or leftward direction) pointed by the steering operation (refer formula 1). When the OBJ 80 is about to steer away from (or already has steered out from) the pathway, the user generally conducts the steering operation rapidly toward a direction where the OBJ 80 should proceed (direction along the pathway). For example, when the OBJ 80 is about to go beyond (or already has gone beyond) the left side end of the pathway, the user generally conducts the steering operation rapidly so as to quickly turn the OBJ 80 toward the right. In this case, the target 300 moves greatly toward the right side direction of the pathway. As a result, the OBJ 80 turns greatly toward the forward direction of the course where the OBJ 80 should proceed.

A more specific description is provided in the following with reference to formula 1. Discussed below is a case where the user conducts the steering operation rapidly toward the rightward direction so as to quickly turn the OBJ 80 toward the right when the OBJ 80 is about to go beyond (or already has gone beyond) the left side end of the pathway. Suppose the right side of formula 1 is TP=−1 (i.e. target 300 is positioned on the left side point C on the pathway in the example in FIG. 14), and UH in formula 1 has largely increased from 0 to 0.5 due to the above described steering operation by the user. In this case, UH−TP in formula 1 is 1.5, and HS in formula 1 is 0.5. As a result, the left side of formula 1 becomes TP=−1+1.5×0.5=−0.25. This means that the target 300 moves toward the right side direction of the pathway for 0.75. As describe here, when the OBJ 80 is about to go beyond (or already has gone beyond) the left side end of the pathway, and when the user conducts the steering operation rapidly toward the rightward direction, the target 300 moves greatly toward the right side direction of the pathway. As can be understood from FIG. 18 and FIG. 19, the larger the difference which is between the target direction j and the direction e (direction defined by UHA) and which is defined by the steering operation of the user is, the greater the moving direction f of the OBJ 80 is pulled from the direction e toward the target direction j. Therefore, in this case, the moving direction of the OBJ 80 is greatly pulled toward the target 300. Thus, the OBJ 80 turns greatly toward the forward direction of the course where the OBJ 80 should proceed. As a result, the moving direction of the OBJ 80 can be assisted so as to approach the direction where the OBJ 80 should proceed (course forward direction).

As described above, according to the current invention, the operation by the user can be moderately assisted in a game that requires a relatively high level of operation skills for the user (e.g. a virtual bicycle game, described in the embodiment above, in which the OBJ 80 is advanced by the pedaling operation (refer FIG. 10) while the traveling direction of the OBJ 80 is altered by the steering operation (refer FIG. 9)). As a result, the user can enjoy the operation without losing a realistic feel for the operation.

In the description above, acceleration data of the core unit 70 and the subunit 76 are used in order to reflect the steering operation and the pedaling operation conducted by the user in the motion of the OBJ 80. However, the steering operation and the pedaling operation conducted by the user may be reflected in the motion of the OBJ 80, by using data that corresponds to rotational motions of the core unit 70 and the subunit 76. In this case, the core unit 70 and the subunit 76 will each include a gyro sensor and the like. Moreover, the steering operation and the pedaling operation conducted by the user may be reflected in the motion of the OBJ 80 by using data that corresponds to inclinations of the core unit 70 and the subunit 76. In this case, the core unit 70 and the subunit 76 will each include an inclination sensor. Furthermore, the steering operation and pedaling operation conducted by the user may be reflected in the motion of the OBJ 80 by using image data taken by cameras fixed on the core unit 70 and the subunit 76. In this case, the core unit 70 and the subunit 76 will each include a camera (e.g. the imaging information calculation section 74 in FIG. 6). Thus, by using sensors capable of outputting data that can be used to calculate inclinations of the core unit 70 and the subunit 76, the steering operation and the pedaling operation can be detected and reflected in the motion of the OBJ 80.

Furthermore, in the description above, the steering operation is conduct by having the user tilt the core unit 70 and the subunit 76 in the left-right direction (refer FIG. 9). However, the steering operation may be conducted by having the user tilt either one of the core unit 70 or subunit 76 in the left-right direction.

Furthermore, in the description above, the pedaling operation is conducted by having the user alternately swinging forward the core unit 70 and the subunit 76 (refer FIG. 10). However, the pedaling operation may be conducted by having the user swing forward either one of the core unit 70 or the subunit 76. In this case, swinging motion of the unit (core unit 70 or subunit 76) that is subjected to swinging is detected.

Furthermore, a game in which a bicycle runs in the game is described above as one example. However, the game is not limited to this type, and the game may be, for example, a boat driving game, a human running game, a human swimming game, and the like.

Furthermore, the shapes of the above described controller 7; and the shape, number, and installation position and the like of the operation section 72 provided to the controller 7 are merely one example, and the current invention can be attained with other shapes, numbers, and installation positions.

Furthermore, although the game apparatus 12 is operated by the controller 7 in the above described embodiment, for example, an information processing apparatus such as a generally personal computer may be operated by an input device that includes detecting means which can detect a steering operation and a pedaling operation.

While the current invention has been described in detail, the foregoing description is in all aspects illustrative and not restrictive. It is understood that numerous other modifications and variations can be devised without departing from the scope of the invention.

What is claimed is:

1. A game apparatus that performs a game process of moving a user object within a game space, the game apparatus comprising:
    an operation data acquiring unit for acquiring operation data from an input device that is operated by the user;
    an input direction calculating unit for calculating an inputted direction within the game space based on the operation data;
    a target configuring unit for configuring, by utilizing the operation data, a target within a predetermined range which is frontward in a forward direction of a course where the user object should move along and which is defined based on the course, the target being provided in order to determine a moving direction of the user object;
    a moving direction determining unit for determining the moving direction of the user object based on a position of the user object and a position of the target;

a moving unit for moving the user object toward the moving direction determined by the moving direction determining unit,
  wherein the target configuring unit configures the target by changing the position of the target configured in the immediately preceding process based on the movement of the user object changing in accordance with the inputted direction input from the input device.

2. The game apparatus according to claim 1, wherein the game apparatus further comprises relative position configuring unit for configuring, based on the operation data, a relative position from the center of the course, within the predetermined range defined based on the course, and wherein
  the target configuring unit configures the target to a position that corresponds to the relative position within the predetermined range.

3. The game apparatus according to claim 1, wherein the target configuring unit changes the position of the target configured in the immediately preceding process by further utilizing an alteration speed that indicates the degree of change of the inputted direction, and configures the target by changing the position of the target such that the position of the target is influenced more by the inputted direction when the alteration speed is larger.

4. The game apparatus according to claim 1, wherein the moving direction determining unit determines a direction, which is calculated based on the inputted direction and a target direction that is from the user object toward the target, as the moving direction.

5. The game apparatus according to claim 1, wherein the input device comprises a sensor that outputs data which enables calculation of an inclination of the input device, and wherein
  the operation data includes data that is outputted from the sensor.

6. The game apparatus according to claim 5, wherein:
  the input device comprises two housings;
  the two housings comprise acceleration sensors, one for each housing, as the sensor;
  the operation data comprises two acceleration data outputted from each of the acceleration sensors;
  the input direction calculating unit calculates an average value of inclinations of the two housings based on the two acceleration data, and calculates the inputted direction based on the average value.

7. The game apparatus according to claim 1, wherein
  the input device comprises an acceleration sensor that outputs acceleration data which indicates an acceleration of the input device, wherein
  the game apparatus further comprises a swing-detecting unit for detecting a swinging motion applied to the input device based on the acceleration data outputted from the acceleration sensor, and wherein
  the moving unit increases a motion speed of the user object based on a detection of an applied swinging motion.

8. The game apparatus according to claim 1, wherein the target is in the position frontward, when viewed from the user object, on the course in the forward direction.

9. A non-transitory computer-readable storage medium that stores a game program which is to be executed by a computer in a game apparatus which performs a game process of moving a user object in a game space, and the computer-readable storage medium that stores the game program causes the computer to execute instructions comprising:
  acquiring operation data from an input device that is operated by the user;
  calculating an inputted direction within the game space based on the operation data;
  configuring, by utilizing the acquired operation data, a target within a predetermined range which is frontward in a forward direction of a course where the user object should move along and which is defined based on the course, the target being provided in order to determine a moving direction of the user object;
  determining the moving direction of the user object based on a position of the user object and a position of the target;
  moving the user object toward the determined moving direction,
  wherein the target is configured by changing the position of the target configured in the immediately preceding process based on the movement of the user object changing in accordance with the inputted direction input from the input device.

10. The non-transitory computer-readable storage medium that stores the game program according to claim 9, wherein the game program causes the computer to further execute instructions comprising:
  configuring, based on the operation data, a relative position from the center of the course, within the predetermined range defined based on the course,
  wherein the target is configured to a position that corresponds to the relative position within the predetermined range.

11. The non-transitory computer-readable storage medium that stores the game program according to claim 9, wherein the position of the target configured in the immediately preceding process is changed by further utilizing an alteration speed that indicates the degree of change of the inputted direction, and the target is configured by changing the position of the target such that the position of the target is influenced more by the inputted direction when the alteration speed is large.

12. The non-transitory computer-readable storage medium that stores the game program according to claim 9, wherein a direction, which is calculated based on the inputted direction and a target direction that is from the user object toward the target, is determined as the moving direction.

13. The non-transitory computer-readable storage medium that stores the game program according to claim 9, wherein the input device comprises a sensor that outputs data which enables calculation of an inclination of the input device, and wherein
  the operation data comprises data that is outputted from the sensor.

14. The non-transitory computer-readable storage medium that stores the game program according to claim 13, wherein:
  the input device comprises two housings,
  the two housings comprise acceleration sensors, one for each housing, as the sensor,
  the operation data comprises two acceleration data outputted from each of the acceleration sensors,
  an average value of inclinations of the two housings is calculated based on the two acceleration data, and
  the inputted direction is calculated based on the average value.

15. The non-transitory computer-readable storage medium that stores the game program according to according to claim 9, wherein
  the input device comprises an acceleration sensor that outputs acceleration data which indicates an acceleration of the input device, the game apparatus further comprises a swing-detecting unit for detecting a swinging motion applied to the input device based on the acceleration data outputted from the acceleration sensor, and
a motion speed of the user object is increased based on a detection of an applied swinging motion.

16. A game system, comprising:
a display device configured to display image data; and
a game apparatus that performs a game process of moving a user object within a game space, the game apparatus coupled to the display device and having one or more processors, the game apparatus comprising:
   an operation data acquiring unit for acquiring operation data from an input device that is operated by the user,
   an input direction calculating unit for calculating an inputted direction within the game space based on the operation data,
   a target configuring unit for configuring, by utilizing the operation data, a target within a predetermined range which is frontward in a forward direction of a course where the user object should move along and which is defined based on the course, the target being provided in order to determine a moving direction of the user object,
   a moving direction determining unit for determining the moving direction of the user object based on a position of the user object and a position of the target,
   a moving unit for moving the user object toward the moving direction determined by the moving direction determining unit,
   wherein the target configuring unit configures the target by changing the position of the target configured in the immediately preceding process based on the movement of the user object changing in accordance with the inputted direction input from the input device.

17. A method for performing a game process of moving a user object in a game space, the method implemented using an information processing apparatus having a memory and one or more processors, the method comprising:
   acquiring operation data from an input device that is operated by the user;
   calculating an inputted direction within the game space based on the operation data;
   configuring, by utilizing the acquired operation data, a target within a predetermined range which is frontward in a forward direction of a course where the user object should move along and which is defined based on the course, the target being provided in order to determine a moving direction of the user object;
   determining, via the one or more processors, the moving direction of the user object based on a position of the user object and a position of the target;
   moving the user object toward the determined moving direction,
   wherein the target is configured by changing the position of the target configured in the immediately preceding process based on the movement of the user object changing in accordance with the inputted direction input from the input device.

* * * * *